(12) United States Patent
Naoi et al.

(10) Patent No.: US 7,406,075 B2
(45) Date of Patent: Jul. 29, 2008

(54) CROSSBAR SWITCH, METHOD FOR CONTROLLING OPERATION THEREOF, AND PROGRAM FOR CONTROLLING OPERATION THEREOF

(75) Inventors: Junichi Naoi, Tokyo (JP); Tomohiro Ohto, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 864 days.

(21) Appl. No.: 10/805,366

(22) Filed: Mar. 22, 2004

(65) Prior Publication Data

US 2004/0228337 A1 Nov. 18, 2004

(30) Foreign Application Priority Data

Mar. 24, 2003 (JP) ............................. 2003-081258

(51) Int. Cl.
*H04L 12/50* (2006.01)
(52) U.S. Cl. .................. 370/360; 370/387; 370/388; 370/390; 370/408; 370/413; 709/243; 712/11
(58) Field of Classification Search ............. 370/360, 370/387, 388, 390, 408, 413; 709/243; 712/11
See application file for complete search history.

(56) References Cited

U.S. PATENT DOCUMENTS

| | | | | |
|---|---|---|---|---|
| 4,365,292 A | | 12/1982 | Barnes et al. | |
| 4,814,762 A | * | 3/1989 | Franaszek | 340/2.2 |
| 4,876,681 A | * | 10/1989 | Hagiwara et al. | 370/408 |
| 5,157,654 A | * | 10/1992 | Cisneros | 370/414 |
| 5,440,546 A | * | 8/1995 | Bianchini et al. | 370/413 |
| 5,541,914 A | * | 7/1996 | Krishnamoorthy et al. | 370/427 |
| 5,754,792 A | * | 5/1998 | Shutoh et al. | 709/243 |
| 6,201,808 B1 | * | 3/2001 | Wang et al. | 370/390 |
| 6,335,930 B1 | * | 1/2002 | Lee | 370/387 |
| 6,708,000 B1 | * | 3/2004 | Nishi et al. | 398/1 |
| 2003/0118054 A1 | * | 6/2003 | Zhu et al. | 370/474 |
| 2004/0228337 A1 | * | 11/2004 | Naoi et al. | 370/360 |

FOREIGN PATENT DOCUMENTS

WO WO 93/08658 4/1993

\* cited by examiner

*Primary Examiner*—Huy D. Vu
*Assistant Examiner*—Luat Phung
(74) *Attorney, Agent, or Firm*—Michael Bednarek; Paul, Hastings, Janofsky & Walker LLP

(57) ABSTRACT

A small cost-effective crossbar switch is provided. A switch circuit is disposed in each of a plurality of nodes which are cascade connected with each other in a plurality of stages. Each switch circuit receives from a node of a previous stage a designated address to specify directly or indirectly the relative position in which a target switch circuit is present, determines whether the designated address represents a specific value "0". When it is determined that the specific value is represented, each switch circuit allows data output to a node-out line, decrements the received designated address by "1" to generate a new designated address, and supplies this new designated address to a node of the subsequent stage.

18 Claims, 24 Drawing Sheets

CROSSBAR SWITCH, METHOD FOR CONTROLLING OPERATION THEREOF, AND PROGRAM FOR CONTROLLING OPERATION THEREOF

CROSS REFERENCE TO RELATED APPLICATION

The present application claims priority from Japanese Application No. 2003-81258 filed Mar. 24, 2003, the disclosure of which is hereby incorporated by reference herein.

BACKGROUND OF THE INVENTION

1. Field of the Invention

The present invention relates to a crossbar switch mounted on a computer, for example, for image processing, and to a product associated therewith.

2. Description of the Related Art

A crossbar switch is a system component for realizing, with few limitations, the node coupling in a multiprocessor. Typical crossbar switches have a plurality of buses arranged in the form of a two-dimensional grid. Switch mechanisms are disposed in each of a plurality of intersection points (called "cross points") where buses intersect with each other. At the time of operation, a data path defined by a combination of certain portions of buses and cross points between node-in lines (buses for the data input to each node) and node-out lines (buses for the data output from each node) can be selectively switched by controlling connection/disconnection of cross points with switch mechanisms.

Advantages of the crossbar switch are in excellent non-blocking ability preventing collisions between the data and a comparatively simple structure and control thereof. For this reason, they are used in many data processing devices.

It is well-known that the structure of the conventional crossbar switch requires that the number of switch mechanisms be a square of the number of nodes. Furthermore, in the case of parallel connections, an additional circuit element such as an input buffer or arbiter for each bus has to be provided to avoid the problem of competition between the output lines. For this reason, the size of the crossbar switch was difficult to reduce.

For example, in a crossbar switch of a configuration switching 256 to 1024 nodes, the number of cross points is 64 kilopoints to 1 megapoints. If the bus width of a parallel bus is 32 bits, then the number of switches is maximum 32 mega-units. Configuring and mounting such a large-scale system on a small area is extremely difficult with present process rules. Furthermore, with the conventional configuration of crossbar switches, not only the switch control during changeover processing of data paths becomes more complex as the number of switches increases, but also the number of lines for switch control rapidly increases.

The present invention was made to solve the above-mentioned problems, and it is an object of the present invention to provide a small cost-effective crossbar switch, without increasing the number of lines and without increasing the complexity of switch control during changeover processing of data paths, even when the number of switches is increased, and to provide a product associated therewith.

SUMMARY OF THE INVENTION

In the crossbar switch provided by the present invention, a node controller provided in each of a plurality of nodes which are cascade connected with each other in a plurality of stages, each node controller having an input interface which receives, from a node in the previous stage, address information for directly or indirectly specifying the relative position in which a target node controller is present; a switch determining whether the received address information represents the specific value, allowing the data output to a predetermined data output line when it is determined that the specific value is represented, and generating new address information in which the received address information is changed according to a predetermined rule; and an output interface for supplying the new address information to a node in the subsequent stage.

The "predetermined rule" as referred to herein is, for example, a rule according to which the value represented by the address information is brought closer to the specific value by fixed intervals each time a node is passed, and the value is considered to be useless on the subject node line after the specific value reaches.

With the crossbar switch of the above-described configuration, providing the address information causes the corresponding node controller to autonomously conduct data output to the data output line.

Data such as circulating numerical data can be used for the above-mentioned address information. In this case, the above-mentioned output interface generates the above-mentioned new address information by increasing or decreasing the numerical data in the same changing direction by a predetermined value. Using numerical data facilitates the decision as to whether the address information represents the specific value.

Further, the address information can also be serial data comprising a start bit and an end bit. The advantage of using serial data is that data line can be shortened, and introducing a start bit and an end bit makes it easier to specify the numerical data.

The crossbar switch may be a crossbar switch having a plurality of node lines, each containing the above-mentioned nodes of a plurality of stages can also be obtained. In this case, the node controllers on each node line may be operated asynchronously with the node controllers on other node lines, or may be operated at the same clock timing with the node controllers on other node lines, at least those that operate in parallel therewith. The advantage of the first case is that the switch control is facilitated or simplified, and the advantage of the latter case is that the delay difference of data transmission between the nodes is eliminated.

Each of the nodes of the plurality of stages is one-to-one associated with the output addresses of a predetermined data memory, and a switch of each node controller, during operation thereof, may supply the data that are received from the data memory to the data output line via the output address associated with the corresponding node. In this case, the desired data are produced from the data memory merely by providing the address information.

In the crossbar switch comprising a plurality of node lines each containing the nodes of the plurality of stages, in which the node controller on each node line operates synchronously (at the same clock timing) with the node controllers on other node lines, at least those that operate in parallel therewith, a first path and a second path may be established, the first path being for supplying data from a node in the previous stage to respective node controllers on each node line and for supplying the data to a node in the subsequent stage in the other node line, the second path being for supplying the address information from the node in the previous stage and supplying the new address information to the node in the subsequent stage on the same node line.

In the crossbar switch of such a configuration, the number of data paths that can be switched can be increased.

In the above-described crossbar switch having a first path and a second path defined therein, node controllers may be arranged as a row-column matrix on a plurality of node lines, the second path may be defined in the column direction of each node line, and the first path may be defined between the output terminal of a node controller of the previous stage and the input terminal of a node controller present in the next stage with respect to this node controller and in a different column.

This arranging the node controllers as a row-column matrix makes it possible to standardize the structure of crossbar switches and facilitates multistage connection.

In the above-described crossbar switch in which the node controllers are arranged as a row-column matrix, the data delay amount during multistage connection can be reduced by providing the same or almost the same node length in the first path and the second path in each node controller.

At least all the node controllers arranged in the same row direction may be operated according to a clock signal determining the same operation timing. In such a case, even when node lines of each row operate asynchronously, data can be simultaneously produced from the output ends thereof.

The first path is defined between, for example, the output terminal of a node controller of the previous stage and the input terminal of a node controller present in the next stage with respect to this node controller and in the adjacent column.

Alternatively, for example, the entire first path or part thereof is defined between the output terminal of the node controller of the previous stage and the input terminal of a node controller present in the next stage with respect to this node controller and in a position separated by a plurality of columns from this node controller. In this case, the first path relating to the node controller positioned in the endmost portion in the column direction is defined between the output terminal of the respective node controller and the input terminal of the node controller located in the adjacent position in the next stage.

A crossbar switch according to another aspect comprises address information generation means provided at each input end of the plurality of node lines, the address information generation means serving to generate the address information according to a first line identification data for use in identifying the node line on which the address information generation means locates, and a second line identification data for use in identifying the node line which is expected to receive the data supplied from a switch in a node in the last stage on the line on which the address information generation means locates.

With such address information generation means, any node line can be designated for data output.

The crossbar switch in accordance with the present invention can be accommodated in a package that can be mounted on a computer. In this case, providing interface components at the input ends of the above-mentioned plurality of node lines for connecting a first device holding the data to be supplied to the input end in question, and providing different interface components at the output ends of the above-mentioned plurality of node lines for connecting a second device having operation pipelines at one-to-one correspondence with the node lines facilitates the connection to those devices.

Furthermore, providing interface components for connecting a plurality of node lines of another crossbar switch of the same configuration to the input ends and/or the output ends of the plurality of node lines facilitates further scale expansion.

The present invention also provides a method for operation control of a crossbar switch.

This method is a method for operation control of a crossbar switch, the crossbar switch comprising nodes that are cascade connected with each other in a plurality of stages and a plurality of node lines through which data to be produced flow, each node having a node controller, the method comprising the steps of: generating an address information from the identification information of a node line the data on which is to be produced and the information representing the relative position of the node controller which is to be actuated and supplying this address information to a node of the initial stage on a target node line; determining, by the respective node controllers present in each node of the node line to which the address information is supplied, whether the received address information represents the specific value, producing the data present on the corresponding node line when it is determined that the specific value is represented and generating a new address information by changing the received address information by a predetermined value, and supplying this new address information to the nodes of subsequent stages.

With this method, the corresponding node controllers conduct data output autonomously merely by providing address information. Therefore, the control of the crossbar switch can be conducted in an easy manner for each node line.

The present invention also provides a computer program for conducting the operation control of a crossbar switch by co-action with hardware resources of a computer.

This program is a program for operation control of a crossbar switch, the crossbar switch comprising nodes that are cascade connected with each other in a plurality of stages and a plurality of node lines through which data to be produced flow, each node having a node controller, the program being carried out by a computer having mounted thereon the crossbar switch to operate each node controller to:

(1) receive address information for directly or indirectly specifying the relative position in which the target node controller is located;

(2) determine whether the received address information represents a specific value, and produce the data present on the respective node line when it is determined that the specific value is represented; and (3) generate new address information by changing the received address information by the predetermined value and supply this new address information to the nodes of subsequent stages.

DETAILED DESCRIPTION OF THE PREFERRED EMBODIMENTS

First Embodiment

The crossbar switch of the present invention can be applied to, for example, data transfer control between a memory and a processor in an image rendering device which processes a large volume of data for image rendering.

An embodiment relating to this case is described hereinbelow.

First, an image rendering device in which the present invention is employed is described.

Figure 1:
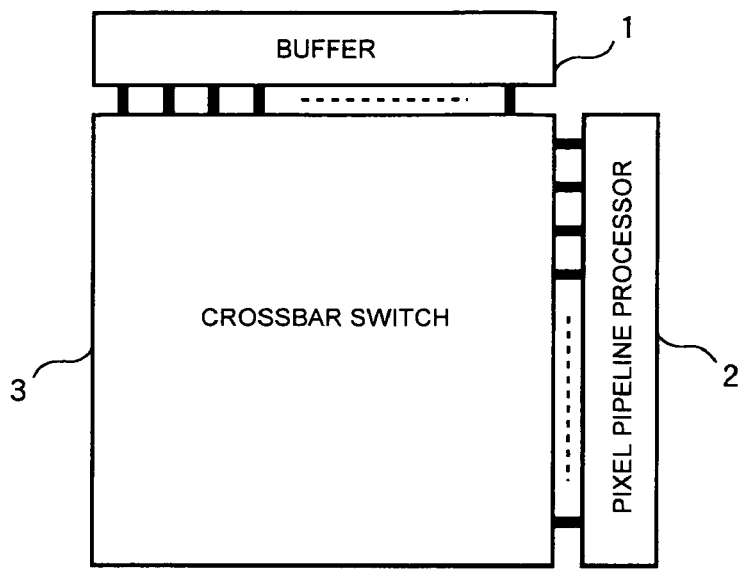
FIG. 1 is a structural view illustrating essential parts of an image rendering device in which the present invention is employed.

FIG. 1 is a structural diagram illustrating essential components of this image rendering device. In order to provide data necessary for image rendering processing, the image rendering device comprises a buffer (memory buffer) 1 as an example of a semiconductor device, a pixel pipeline processor 2 having a serial operation pipeline, and a crossbar switch 3 connected between the buffer 1 and the pixel pipeline processor 2 via interface components.

The buffer 1 is a data memory storing the above-mentioned data that are to be transmitted to the crossbar switch. In the present embodiment, as an example, data such as CLUT (Color Look Up Table) and texture for generating the entire color and pattern on a polygon by mapping are stored. The CLUT comprises a table for the three primary colors, R (red), G (green), and B (blue) and an α value table. The table for the three primary colors, R, G, and B is used for determining the color of each pixel of the texture, and the α value is a coefficient value for determining for each pixel the blend (α blending) ratio of images when the texture is mapped, that is, a coefficient value representing semi-transparency. The index for picking up the three primary colors R, G, and B from the CLUT (the value for specifying the table number in the CLUT) is defined for each pixel represented by the XY coordinates of the texture.

The pixel pipeline processor 2 conducts reading of data from the buffer 1 and also conducts texture mapping, comparison of Z coordinates, and pixel value calculations by a pipeline system.

The pixel pipeline processor 2 also conducts the processing of extracting the edge of image brightness, the processing of picking up the data for the three primary colors, R, G, and B from the CLUT according to the texture index and setting the color of each pixel, and the α blend processing using the α value (graded α value) picked up from the CLUT by using byte values of each pixel in a G plane as an index. Furthermore, the pixel pipeline processor 2 conducts processing such as scissoring, dithering, and color clamping. Scissoring is a processing technique for deleting data that fall outside of a screen, dithering is a processing technique for incorporating the arrangement of colors for representing a large number of colors with a small color palette, and color clamping is a processing technique employed during color computation for limiting the value thereof so that it does not exceed 255 or does not become less than 0.

Data obtained by conducting the above-mentioned processing in the pixel pipeline processor 2 are stored in a frame buffer (not shown in the figures) and then converted into frame data (two-dimensional image data) rendered on a two-dimensional monitor screen.

Those frame data are then read out from the frame buffer, produced from an output terminal and sent to a two-dimensional monitor unit.

[Crossbar Switch]

The configuration of the crossbar switch 3 and the operation thereof is described below with reference to FIGS. 2 to 5.

Figure 2:
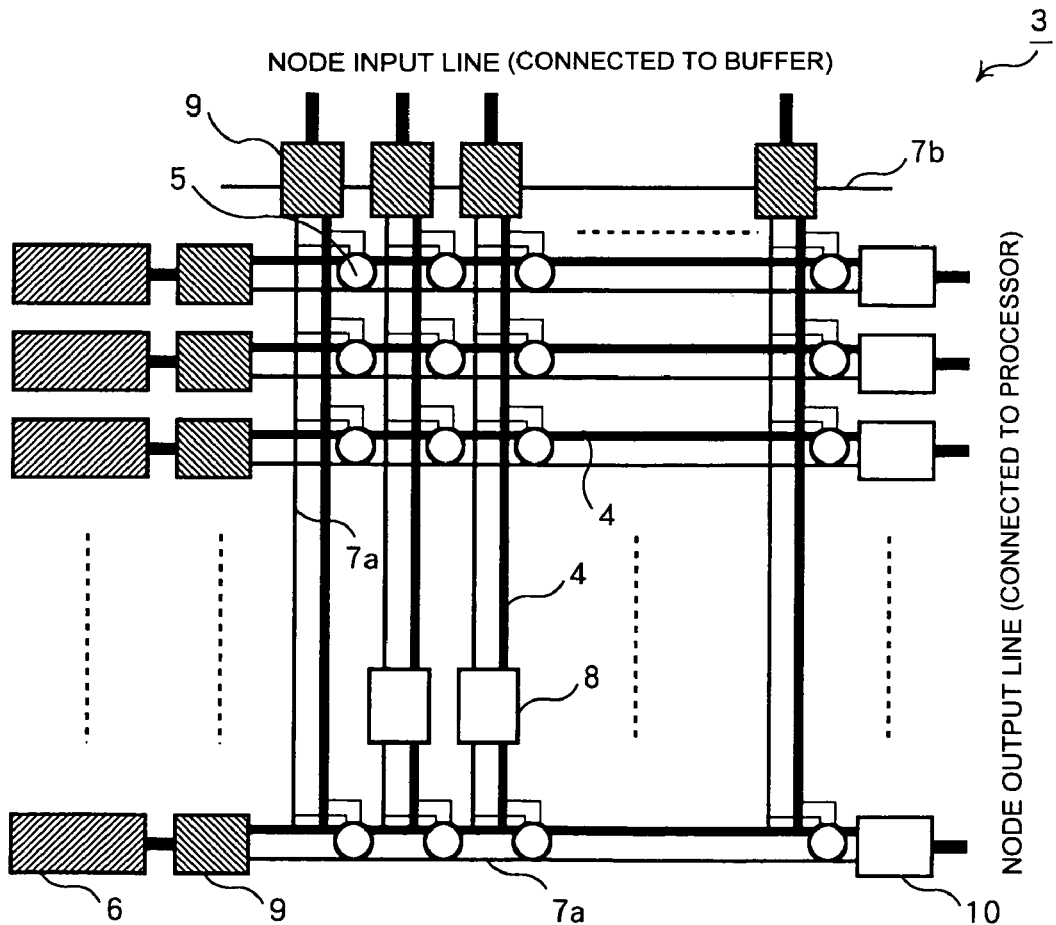
FIG. 2 is a structural view of the inner portion of the crossbar switch according to a first embodiment of the present invention.

The crossbar switch 3 is accommodated in a package that can be mounted on a computer for implementing the image rendering device. As shown in FIG. 2, the crossbar switch has a plurality of serial buses 4 arranged in a grid-like fashion. The operation of the crossbar switch 3 is controlled by a controller (not shown in the figures) comprised in the image rendering device when image rendering processing is conducted in the image rendering device. This controller has the functions of conducting the operation control of crossbar switch 3 and image rendering processing by executing a predetermined program with a processor.

The serial buses 4 are divided into two groups: those running through the input sides of the nodes (in the present embodiment, these buses are referred to as "node-in lines") and those running through the output sides of the nodes (in the present embodiment, these buses are referred to as "node-out lines"). Node controllers such as switch circuits 5 are provided at the cross points (i.e., nodes) where the input and node-out lines intersect with each other. The node controllers are for switching the connection/disconnection between the input and node-out lines.

All the node-in lines are connected, with one-to-one correspondence, to output addresses of the buffer 1 via interface components, and the node-out lines are connected to the pixel pipeline processor 2 via interface components.

The relative position of one switch circuit 5 with respect to the position of any other switch circuit can be determined on the node-out line by adjustment in advance by arbitration. For the sake of convenience, in the present specification, the information representing the relative positions of individual switch circuits 5 will be called "an address" of the switch circuit 5. Further, the designated address information for directly or indirectly specifying the address of one switch circuit 5 for connecting node-in line and node-out line will be called "a designated address".

The address used in the present embodiment is the number of nodes on the node-out line, that is, a bit (numerical data) representing a numerical value of the number of cross points, and is circulating such that it is reduced, for example by one bit, each time a cross point is passed in the direction from the address input end of the node-out line to the data output terminal, and at the moment of time a specific value, for example a zero value, is taken, it assumes a maximum value, for example, when the number of cross points is eight, it is 3, 2, 1, 0, 7, 6, 5, 4.

Further, a circulating character string data such as A, B, C, ..., Z, A, ... can also be used as the address instead of the bits representing the numerical values. This character string data is changed by one character each time a cross point is passed and returns to the initial value at the moment of time the specific value (value represented by a character) is assumed.

Figure 5:
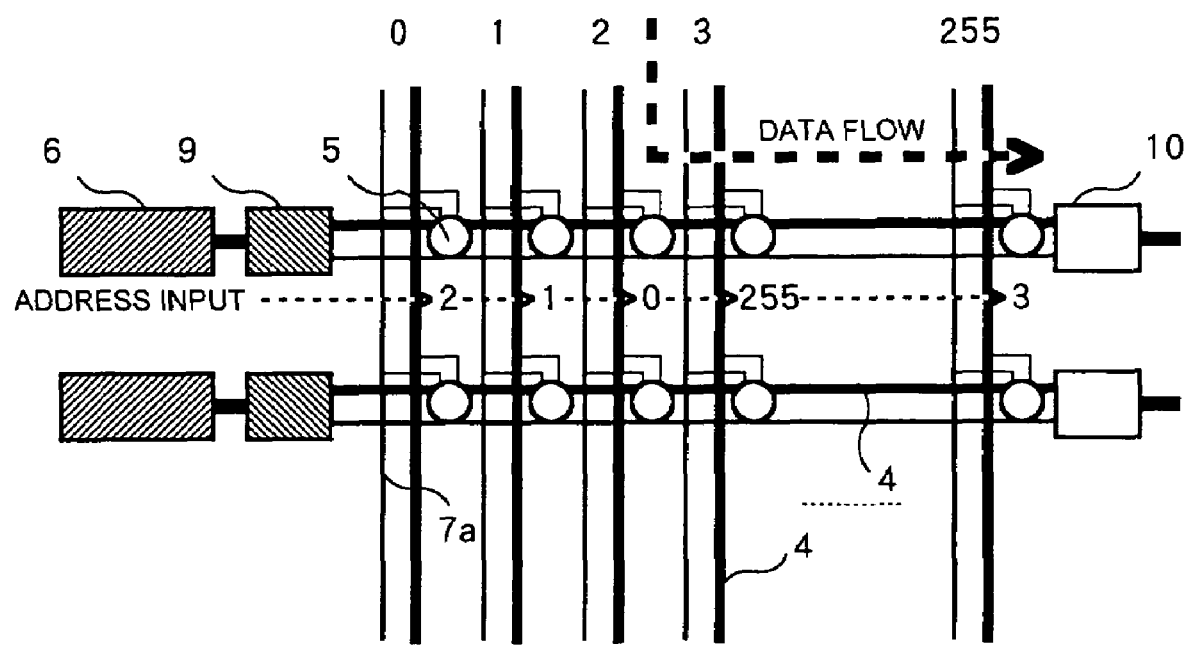
FIG. 5 is an explanatory view illustrating the cross point switching.

Next, an example of addresses is described with reference to FIG. 5. As shown in FIG. 5, when 256 node-in lines are provided so that 256-bit data reaches the output ends of the node-out lines, 256 different numerical data ("255" to "0") are used for the addresses. In other words, it is reduced by 1 bit, the address following "0" is "255", and the next-stage address is "254" ... and so on.

An address section circuit 6 is connected to the address input end of the node-out line. The address section circuit 6 produces a designated address.

A clock line 7a is arranged parallel to each node line to transfer a common clock signal supplied from a clock signal source (not shown) of the controller.

The configuration is such that a clock signal on the clock line 7a passes through a repeater 8, similarly to node lines. Therefore, each switch circuit 5 starts operating at the same time as other switch circuits by referring to the clock signal of the clock line 7a, thereby making it possible to decrease the delay difference of data propagating between the nodes (switch circuits). Furthermore, it is not necessary to take the propagation delay (skew) between the nodes into account and the insert limitation, e.g. of repeaters 8, can be relaxed.

A parallel/serial conversion circuit 9 for converting parallel data read out from the buffer 1 into serial data is connected between the input port of a crossbar switch 3 and the interface component, and a serial/parallel conversion circuit 10 for converting the serial data into parallel data is provided between the output terminal and the interface component. The parallel/serial conversion circuit 9 is composed so that timing of operation can be adjusted by referring to the clock signal on the clock line 7b.

The clock line 7b can transmit a clock signal that is shared with the clock line 7a, but it may also transmit a different clock signal.

When both the buffer 1 and the pixel pipeline processor 2 are configured to allow input and output of serial data, the parallel/serial conversion circuit 9 and the serial/parallel conversion circuit 10 become unnecessary. In particular, when the pixel pipeline processor 2 comprises an serial operation pipeline, the two can be wired merely by providing for one-to-one correspondence between the input terminals of the serial operation pipeline and the output ends of each serial bus of the crossbar switch 3. Therefore, the wiring can be facilitated.

The switch circuit 5 comprises an input interface for receiving the designated address transmitted from the node of the previous stage (switch circuit) of the node-out line, a function of allowing the output of the data of the node-in line to the node-out line and generating a new designated address by reducing the received designated address each time one cross point is passed, while following the predetermined rule, for example, maintaining the circulating sequence, by connecting the node-in line and the node-out line and switching the data path when the received designated address represents a specific value (for example, "0"), and an output interface for transmitting the new designated address to the node of the subsequent stage. Switching the data path and generating a new designated address, as described above, are both performed autonomously in the respective switch circuit 5.

Figure 3:
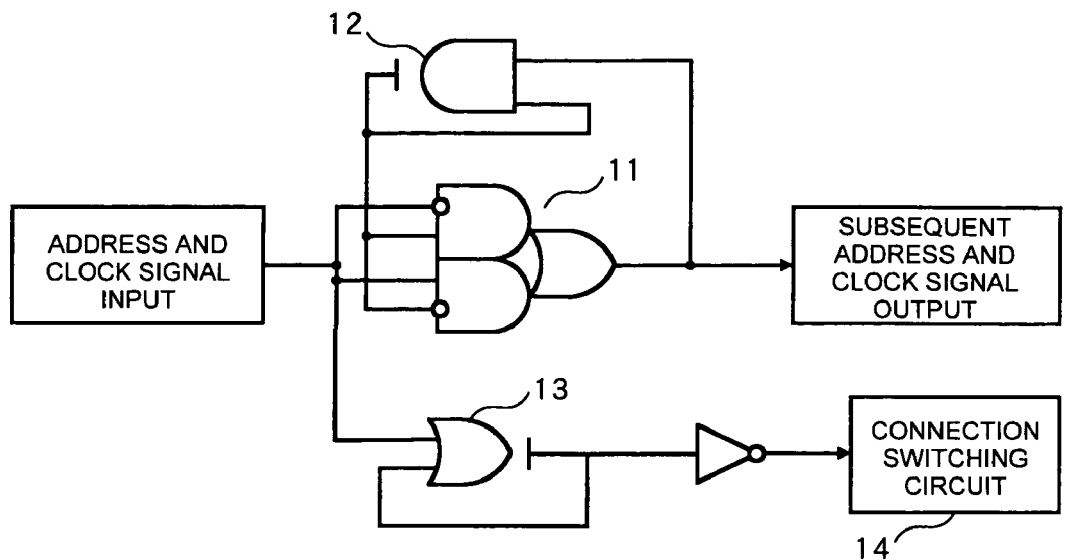
FIG. 3 is a structural view of a switch circuit according to the first embodiment.

The reception of the designated address, switching of the data path, generation of a new designated address, and the output of the new designated address can be conducted by co-action of a logic circuit and software, but it can be conducted in a simpler manner only with a logic circuit shown in FIG. 3.

The switch circuit 5 shown as an example in FIG. 3 comprises a decrement circuit 11 for decrementing by one bit the serial carry bit received via a plurality of cascade connected nodes, as in the node-out line, a logic OR circuit 12 holding all the address bits, a logic AND circuit 13 that produces a selector signal when the address bit becomes "0", and a connection switching circuit 14 for switching connection/disconnection of the node-in line and the node-out line according to the output level of the selector signal.

The switch circuit 5 can recognize that it is itself designated, by detecting that the address bit that it has just received is "0". Therefore the advantage is that the designation of the target switch circuit 5 can be greatly simplified.

In the crossbar switch 3 of the present embodiment, clock lines 7a are wired in parallel to the node-in lines and the node-out lines, and each switch circuit 5 refers to a common clock signal propagating on the clock line 7a to reduce the delay difference of data propagating between the nodes (switch circuits). This is one of means for resolving the above-described problems.

With such a configuration, establishing data synchronization in node units is facilitated, it is not necessary to take into account the propagation delay (skewing) between the nodes, and the insert limitation, e.g. of repeaters 8, can be relaxed.

[Method for Operation Control of Crossbar Switch]

A method for operation control of the crossbar switch 3 is described hereinbelow with reference to the case in which data transfer is conducted from the buffer 1 to the pixel pipeline processor 2.

In this method, the controller of the above-described image rendering device basically plays the leading role, but it may also be implemented, for example, by the pixel pipeline processor 2 under the control by the controller.

The main features of the operation control method are summarized below.

Thus, the controller delivers the designated address as serial data from the input end of any node-out line. The designated address is numerical data representing the serial number of the switch circuit from the input end of the node-out line. In other words, the designated address represents where is the target switch circuit 5 in the serial order of switch circuit from the input end of the node-out line. When the designated address is received, a decision is autonomously made as to whether the received designated address is "0" in each switch circuit 5 of the subjected node-out line. If the zero value is represented, the data on the node-in line is received and transferred to the node of the subsequent stage on the node-out line. Further, a new designated address is generated by subtracting "1" from the received designated address, and this new designated address is supplied as serial data to the node of the next stage.

Figure 4:
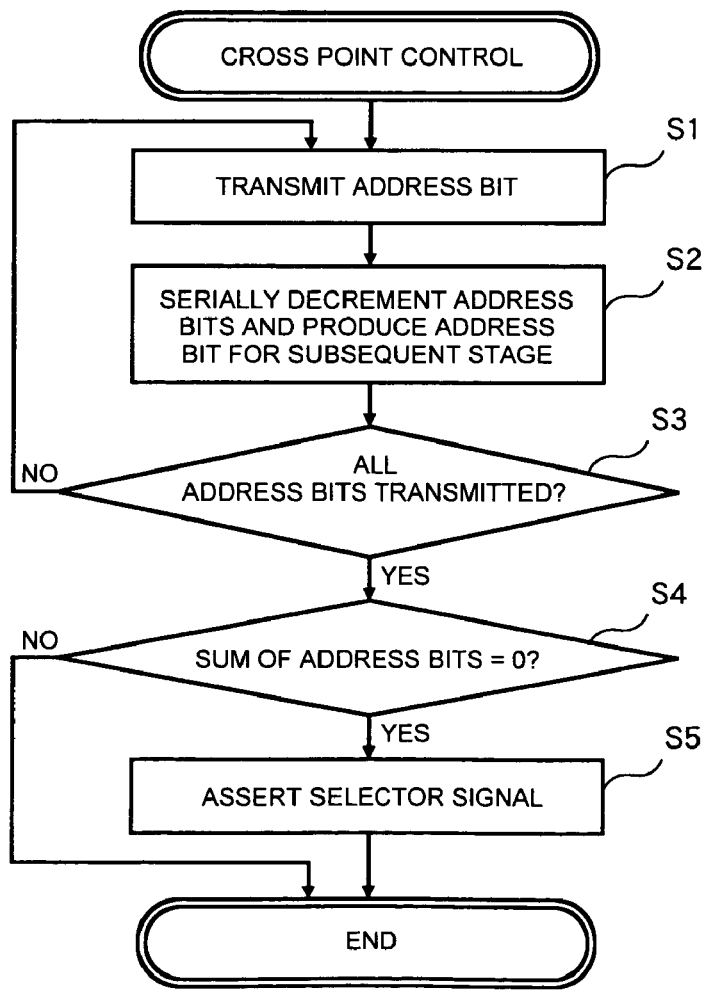
FIG. 4 is a flow diagram illustrating an operation control procedure of the crossbar switch of the first embodiment.

FIG. 4 is a processing flow diagram of the switch circuit 5 relating to the implementation of the above-described operation control by the controller.

<Step 1>

The controller supplies the designated address to an address selection circuit 6 of the node-out line having the target switch circuit 5, and this address selection circuit 6 initializes the designated address and supplies it by one bit to the node-out line.

<Step 2>

The decrement circuit 11 decrements the least significant bit (the address bit that was the first to be received) of the address bits that were received from the node of the previous stage and determines the value of the new designated address (address bit) which is to be supplied to the node in the subsequent stage. When the address bit is "0" during decrementing, rank down (carry down) can occur. Therefore, the next address bit is also decremented.

During this processing, the logic OR circuit 12 holds the address bits from the node of the previous stage in the predetermined memory area.

<Step S3>

The logic AND circuit 13 determines whether the output of the address bits has ended. If it has ended, the processing flow proceeds to step S4, if it has not ended, the processing flow returns to step S1.

<Step S4>

The logic AND circuit 13 determines whether the sum of the address bits is "0". If the sum of the address bits is "0", the processing flow proceeds to step S5.

<Step S5>

The logic AND circuit 13 of the switch circuit 5 asserts the selector signal. The connection switching circuit 14 then connects the node-in line and the node-out line according to the selector signal.

FIG. 5 shows the pattern of this processing. Data transfer is thus conducted from the node-in line to the node-out line.

The control processing is ended once the data transfer is ended.

Data transfer from the buffer 1 to the pixel pipeline processor 2 is appropriately carried out by all the switch circuits 5 autonomously executing the above-described control processing. Employing such an operation control method makes it possible to share the data introduction line and control line for cross point switching (data transferring) and to reduce significantly the number of buses used.

In the crossbar switch 3 of the present embodiment, the node-in lines and the node-out lines are composed of serial buses. When a designated address is supplied to the node-out line, the switch circuit 5 for which the designated address became "0" conducts cross point switching (data transfer) autonomously. As a result, the number of lines can be greatly decreased and the size can be reduced by comparison with the crossbar switch of a parallel type. Moreover, performance degradation caused by a transition to serial buses can be suppressed.

Furthermore, because the individual node-in lines transfer serial data independently of other node-in lines, the node-out lines also transfer the designated addresses independently of other node-out lines. Therefore, asynchronous transfer between the node lines becomes possible, and even when the number of node lines, nodes, and cross points is large, the control thereof does not become complicated.

Each switch circuit 5 can operate according to a clock signal identical to a clock signal determining the operation timing of a switch circuit 5 on the other node line operating at least parallel thereto. Therefore, data transfer delay difference between the nodes can be decreased.

Another advantage of the crossbar switch 3 of the present embodiment is that because cross point switching is carried out merely by supplying the designated address to the desired node-out line, the external operation control relating to data path switching becomes unnecessary and the operation control itself is simplified.

In the description provided above, an example is considered in which the operation control of the crossbar switch 3 is mainly conducted by the controller of the image rendering device. However, the operation control of the crossbar switch can also be executed based on the co-action of a computer that has the crossbar switch mounted thereon, but is present independently of the image rendering device and a control processing program that is recorded on a computer-readable recording medium.

Thus, the operation control is carried out according to the procedure illustrated in FIG. 4 by fitting a recording medium having the operation control program recorded thereon into a computer, loading the operation control program into the storage unit of the computer and reading and executing the operation control program with the computer processor. Examples of the recording medium include computer-readable recording media that can record programs, such as semiconductor memory units, magnetic disks, optical disks, photomagnetic disks, and magnetic tapes.

Second Embodiment

An embodiment of a crossbar switch that can be adapted to multistage pipelines is described hereinbelow.

The crossbar switch of this embodiment comprises a plurality of node lines for transferring serial data from the input ports to the output ports of the crossbar switch. Each node line has a plurality of node controllers connected thereto, all equally spaced apart.

The node line as referred to in this embodiment is a conceptual line provided for convenience in order to make the description compatible with that of the first embodiment. In the present embodiment, the node controller is called "a switch circuit", similarly to the first embodiment.

Figure 6:
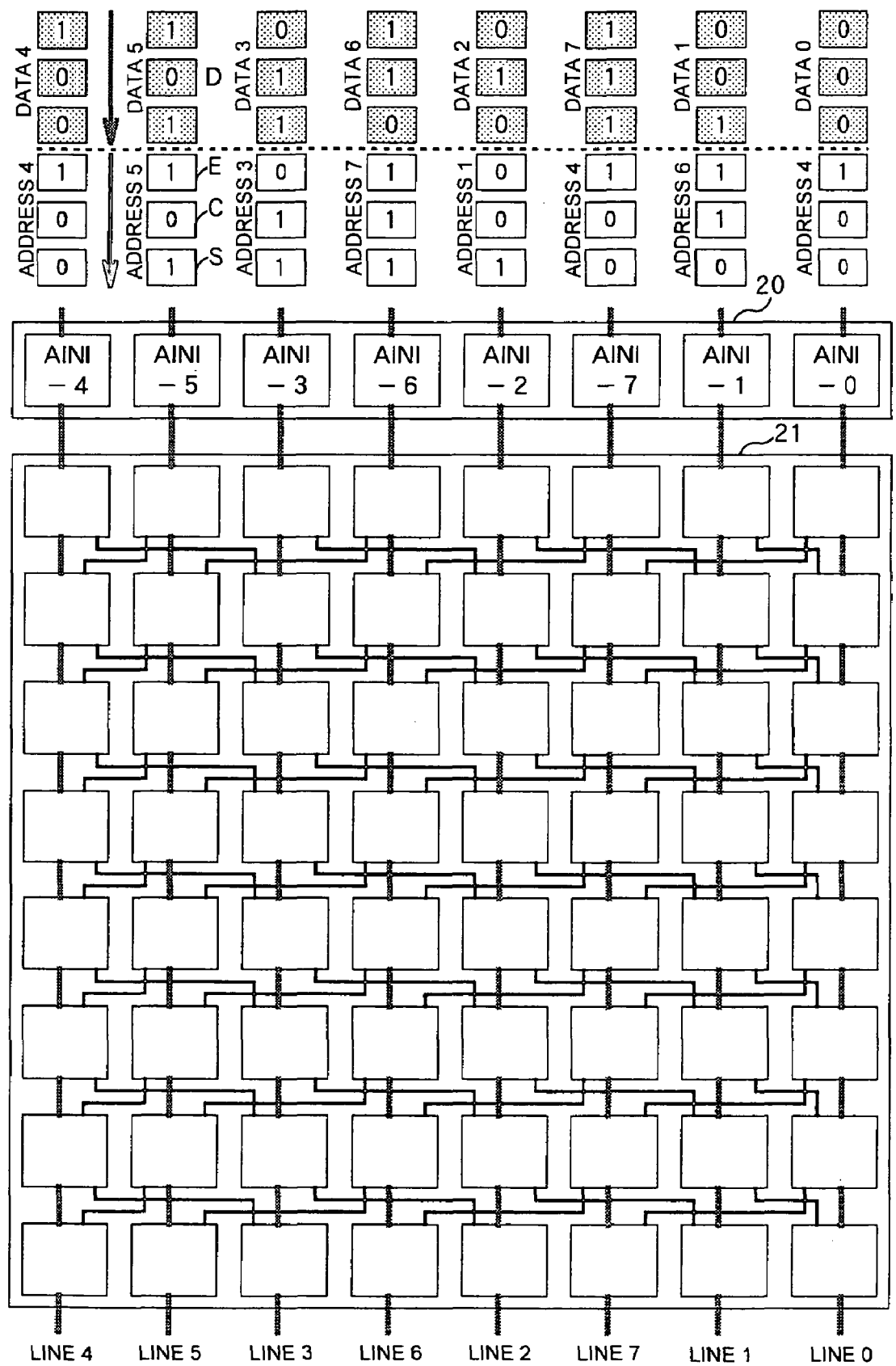
FIG. 6 is a structural view of the inner portion of the crossbar switch according to a second embodiment of the present invention.

FIG. 6 illustrates the specific structural components of the crossbar switch of this embodiment and outlines the operation thereof. The crossbar switch of the present embodiment comprises an address initialization unit 20 serving as an example of address information generation means and a path switching unit 21 for conducting data path switching.

In the example of the crossbar switch considered herein, the switch circuits (shown by rectangles in FIG. 6) in the path switching unit 21 are arranged so as to form an 8×8 matrix.

The differences between the crossbar switch of this embodiment and the crossbar switch 3 of the first embodiment is in that a first path and a second path are defined between the cascade-connected nodes and the first path is defined at an angle with respect to the second path and in the number of nodes that are passed by the data which are to be delivered. By "at an angle" is meant that the first path connects a first switch circuit in a first stage to a second switch circuit in a second stage that is adjacent to the first stage, and the second switch circuit is other than the switch circuit (in the same second stage) connected to the first switch circuit of interest through the second path in the crossbar switch having the switch circuits arranged as a matrix. The matrix-like arrangement of the switch circuits entails the first path being defined at an angle with respect to the second path. It should be noted that the first path is not necessarily "oblique" relative to the second path. It is contemplated within the scope of the invention that the first paths may be defined by lines parallel to the second paths and those perpendicular to the second paths, as in the case shown in FIG. 6. The switch circuits in this embodiment may be similar to those in the crossbar switch 3 of the first embodiment, or they may have a different configuration, as described below.

The first path that is defined at an angle is a path through which the data from each input port flow to the very end so that they can be sent to all the output ports, in the same manner as in the first embodiment. This first path is connecting the output terminal of one switch circuit to the input terminal of another switch circuit in the next stage located in a different column from preceding switch circuit. In the example shown in FIG. 6, the first path is connecting the output terminal of a switch circuit to the input terminal of another switch circuit in every other column in the following stage, and when a node at the very end column is reached, the first path goes to the input terminal of the switch circuit present in the adjacent column in the next stage. Such a setting makes it possible to reduce the data transmission delay difference.

On the other hand, the second path is a path through which the designated address flows from the node in the previous stage (on the same column). The second path is defined along the node line.

This crossbar switch is identical to the crossbar switch 3 of the first embodiment in terms of capability of being accommodated in a package that can be mounted on a computer, capability of directly or indirectly specifying each switch circuit by the respective designated address, and capability of controlling the operation thereof with a controller, for example, of an image rendering device.

In the present embodiment, each node line is distinguished from other node lines by a line number that is a binary identification data, and the designated address is represented by a binary address bit.

To simplify the description provided hereinbelow, the line number and the designated address will be assumed to be represented by three bits each, but this numerical value is merely illustrative and this example should not be construed as limiting.

The address initialization unit 20 shown in FIG. 6 produces a designated address for each switch circuit in the first (initial) stage. The designated address is used for designating the target switch circuit to be connected to the corresponding switch circuit in the first stage. The designated address may be a numerical data representing, for example, where is the target switch circuit in the serial order from the switch circuit in the first stage, in the same manner as in the first embodiment. This address is decremented (reduced) by "1", producing a new designated address, each time a node is passed. Thus, the target switch circuit is supplied with "0" as its own designated address from the switch circuit in the previous stage connected thereto. With these designated addresses, each switch circuit autonomously determines whether the designated address it receives is "0" or not. When the designated address represents "0", data on the first path connected to this switch circuit (switch circuit identified by the designated address) are produced from the node line on the later stage side.

In the example presented in FIG. 6, a case is shown in which the designated address relating to delivery of the data that are supplied to the line #7 from the output end of the line #6 is set to "001". This designated address is sent to the initial switch circuit via the second path.

Figure 7:
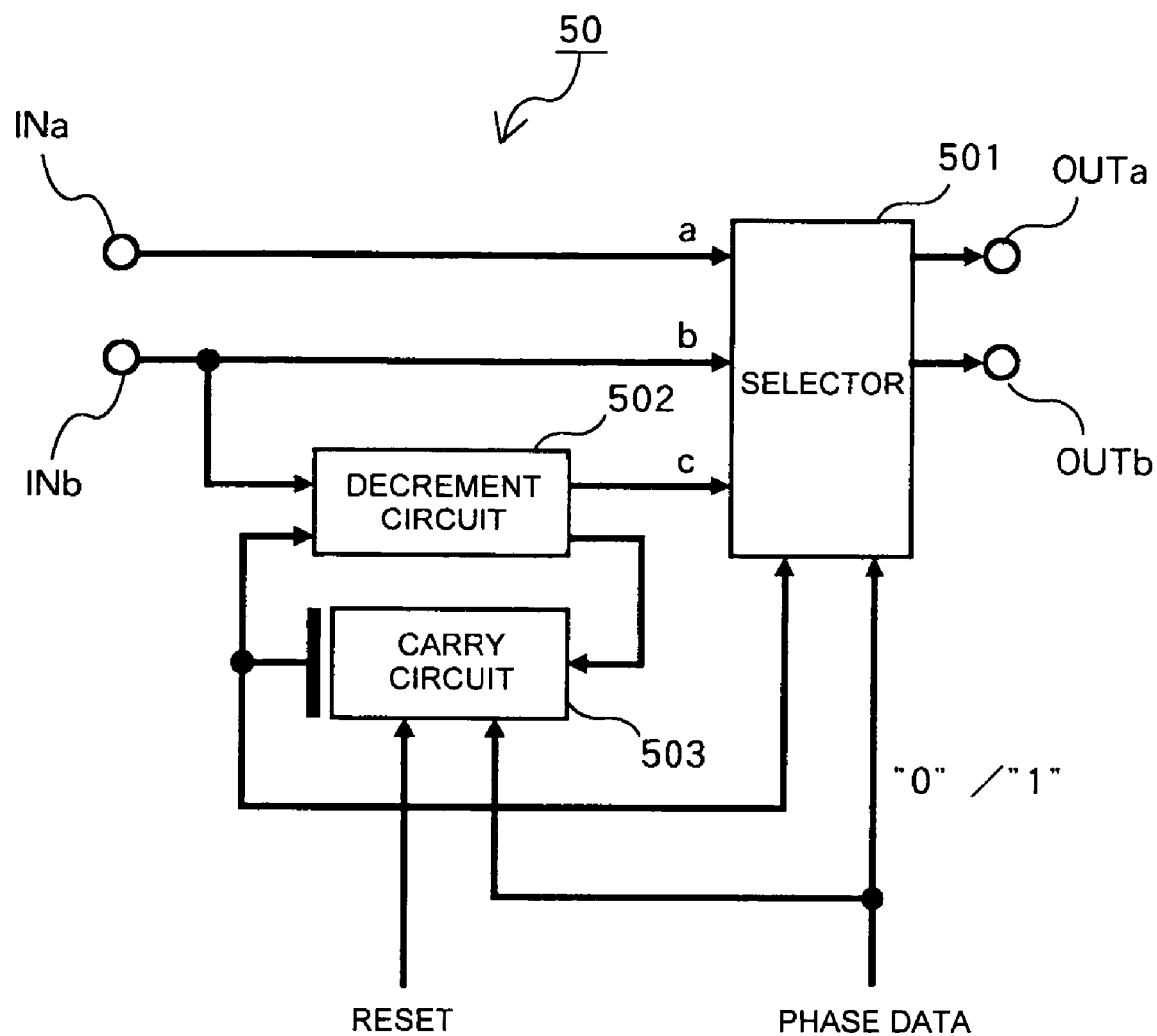
FIG. 7 is a structural diagram of a switch circuit according to the second embodiment.

A specific configuration of the switch circuit used in this embodiment is shown in FIG. 7.

Thus, in a switch circuit 50, serial data "a" is transmitted from a first path input terminal INa serving as an example of an input interface. Serial data "b" is transmitted from a second path input terminal INb also serving as an example of an input interface. Data "c" is obtained by decrementing the serial data "b" with a decrement circuit 502. A selector 501 selectively passes the serial data "a", "b", and "c" through first and second path output terminals OUTa and OUTb serving as examples of output interfaces.

The decrement circuit 502 is provided with a carry circuit 503 and the configuration is such that the logic level ("0"/"1") of the carry bit is given to the input side of the decrement circuit 502 and to the selector 501. The carry circuit 503 is reset by the control start bit which is described later.

The selector 501 and the carry circuit 503 are also provided with phase data produced from the external controller. The phase data serve to form the cross point control phase and the data transfer phase, and is provided as either "0" or "1". When the phase data is "0", it is a cross point control phase for address introduction, and when the phase data is "1", it is a data transfer phase for data introduction. The same phase data are introduced in the selector 501 and the carry circuit 503 of all the switch circuits in each row (stage). The transition from the phase data "0" to the phase data "1" is carried out once all the address bits have flown through. On the other hand, the transition from the phase data "1" to the phase data "0" is carried out based on the instruction from the controller. For example, when an input end of a certain node line and an output end of another node line are connected via the first path and it is necessary to change the connection relationship of other input and output ends, this can be implemented by supplying the phase data from a controller to the carry circuit 503 and the selector 501 of the corresponding switch circuit.

The carry circuit 503 transmits the carry bit when the phase data is "0" and holds the carry bit when the phase data is "1". This carry bit is an important data during phase switching, as described hereinbelow. Thus, the case in which the phase data is "1" and the carry bit is also "1", represents a state in which the given designated address was "0", that is, the switch circuit in question was designated, in the cross point control phase.

The selector 501 conducts the serial data selection according to a predetermined rule.

For example, when the phase data is "0", the data "c" supplied from the decrement circuit 502 is produced through the second path output terminal OUTb.

When the phase data is "1" and the carry bit is "0", the first path input terminal INa is linked to the first path output terminal OUTa, and the second path input terminal INb is linked to the second path output terminal OUTb. When the phase data is "1" and the carry bit is "1", the first path input terminal INa is linked to the first path output terminal OUTa, and the first path input terminal INa is linked to the second path output terminal OUTb.

More specifically, when the phase data is "1", each switch circuit always produces through the first path output terminal OUTa thereof the same bit value as the one received at the first path input terminal INa thereof from the switch circuit in the previous stage connected thereto, regardless of the value of the carry bit. The bit value leaving from the switch circuit through the second path output terminal OUTb is either the same bit value as the one received at the second path input terminal INb thereof when the carry bit is "0", or the same bit value as the one received at the first path input terminal INa thereof when the carry bit is "1".

As described above, when an input end of a certain node line and an output end of another node line are connected via the first path and it is necessary to change the connection relationship of other input and output ends, that is, when it is necessary to change output data for a certain node line (to pass an address again), if the phase data is "0", the first path input terminal INa is linked to the first path output terminal OUTa, and the output of the decrement circuit 502 (second path input terminal INb) is linked to the second output terminal OUTb.

The control start bit and phase data for the above-described reset are supplied as an "instruction array" which is a command sequence from the controller. Furthermore, in the description below, the node controller composed as shown in FIG. 7 represents the switch circuit 50 to make the description compatible with that of the first embodiment.

<Operation Control Method of Crossbar Switch>

How the operation of a crossbar switch is controlled in this embodiment is described below with reference to FIG. 6 and FIGS. 8 to 25.

This method is also mainly implemented by the controller of the image rendering device, but as described above it can also be implemented by the co-action of a computer and program independent from the image rendering device.

Here, an assumption is made that there are eight different data (data #0 to data #7), as depicted in the uppermost part of FIG. 6, and those data leave the path switching unit 21 through either one of the node lines identified by the line numbers (line #0 to line #7) depicted in the lowermost part of FIG. 6.

In this embodiment, the data #0 to #7 are supplied to the crossbar switch through the lines #0 to #7, respectively. The data #4 leaves the switch circuit in the final stage of the path switching unit 21 through the line #0. Likewise, the data #6, #1, #3, #4, #5, #7, and #4 leave from the switch circuits in the final stage through the lines 1, 2, 3, 4, 5, 6, and 7, respectively.

In the following description, the line number is also represented by "n", wherein "n" is an integer between 0 and 7, both inclusive ($0 \leq n \leq 7$). The lines leading into the switch circuits in the first stage via the address initialization unit, through which the data #0 to #7 flow to these switch circuits, are herein referred to as "supply lines". The line numbers associated with the address initialization units (AINI-1 to AINI-7) are identical to data number assigned to the data received by the respective address initialization units, and the line number "n" is equal to the data number. For example, the supply line for the data #5 is designated as "line #5" using the data number of "5".

The lines leading out from the switch circuits in the final stage, through which the data n leaves the crossbar switch, are herein referred to as "destination lines". As described above, the data #4 supplied to the line #4 leaves the crossbar switch through the lines #4, #7, and #0. Thus, the destination lines for the data #4 are the lines #4, #7, and #0.

On the contrary, the data #2 is not produced on any of the lines. This means that no line is used as the destination line for the data #2.

Figure 22:
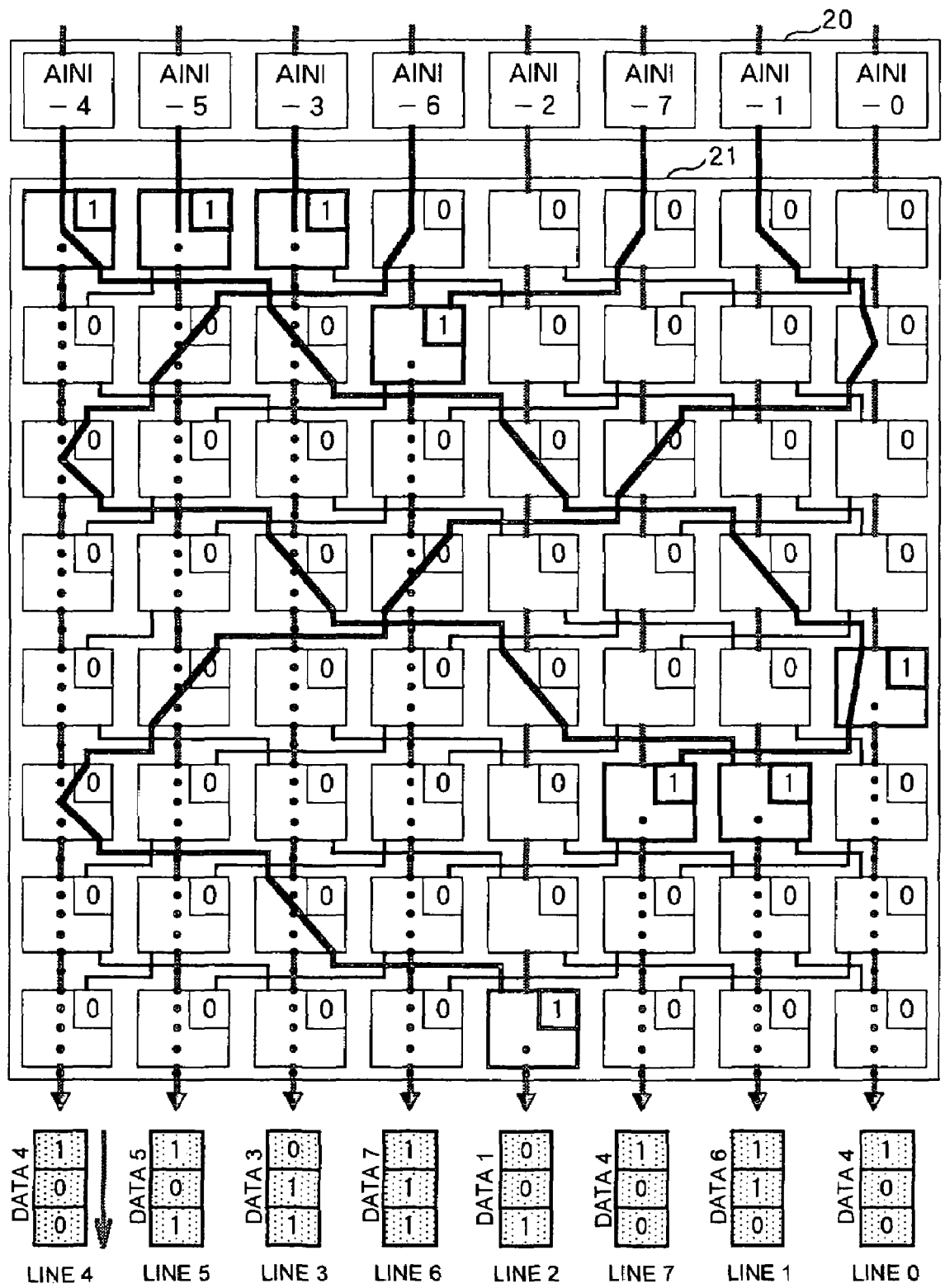
FIG. 22 is a view illustrating the path in a state in which data transfer control is completed.

Furthermore, the data that leaves the switch circuit in the final stage of the path switching unit 21 through the line #n is herein referred to as a "line-n output data". For example, as shown in FIG. 22 details of which are described hereinbelow, the output data of the line #0, i.e., a line-0 output data is the data #4. Likewise, a line-1 output data is the data #6.

Circulating addresses (numerical data) of 7, 6, 5, 4, 3, 2, 1, 0 are assumed to be allocated in the descending order to the switch circuits 50 of each node line.

In order to designate the target switch circuit 50, the controller serially supplies a three-bit address bit to the address initialization unit 20 on the line #n. The three-bit address bit represents the line number of the supply line for the line-n output data. In this example, the data number of a given data is identical to the line number associated with the line on which the address initialization unit locates that is expected to receive the data in question. Therefore, the data number of the line-n output data is the same as the line number of the supply line for the line-n output data.

More specifically, the line-0 output data for the line #0 is the data #4, and the supply line for the data #4 is the line #4. Therefore, the address bit for the line #0 is determined as "4". The line-1 output data for the line #1 is the data #6, and the address bit for the line #1 is determined as "6". Likewise, the address bits for the lines #2, #3, #4, #5, #6, and #7 are "1", "3", "4", "5", "7", and "4", respectively.

In this embodiment, line-n address bits determined in the manner described above are serially supplied to the address initialization unit on the line #n before the data #n is supplied to the address initialization unit.

In the example shown in FIG. 6, the line #0 of the rightmost column is supplied with an address bit "100" for use in identifying the line #4, which is the supply line for the data #4, i.e., the line-0 output data. The data #0 follows the address bit. In FIG. 6, this address bit is represented as an "address #4". The line #1 is serially supplied with an address bit "110" for use in identifying the supply line for the data #6, i.e., the line-1 output data. Likewise, the line #7 is serially supplied with an address bit "100" for use in identifying the line #4. The line #2 is serially supplied with an address bit "001" for use in identifying the line #1. The line #6 is serially supplied with an address bit "111" for use in identifying the line #7. The line #3 is serially supplied with an address bit "011" for use in identifying the line #3. The line #5 is serially supplied with an address bit "101" for use in identifying the line #5. The line #4 is serially supplied with an address bit "100" for use in identifying the line #4. The address initialization units 20 (AINI-0 to AINI-7) calculate designated addresses according to the line number associated therewith and an address bit received. In FIG. 6, these address bits are represented as "address #1" to "address #6". Moreover, the numerical values in the address initialization units AINI-0 to AINI-7 correspond to the line number of the node lines on which the associated address initialization units locate.

The initial bit S among the address bits is a control start bit that is provided synchronously with the LSB (Least Significant Bit). Input of this control start bit in the switch circuits 50 initializes the carry circuit 503 and causes the selector 501 to pass one address bit.

The second bit C among the address bits is a control bit that is provided synchronously with the main data.

The third bit among the address bits is an end bit that is provided synchronously with the MSB (Most Significant Bit). When the end bit is provided, the switch circuit 50 for which the carry bit is "1" becomes that target switch circuit for conducting data transmission.

The switch circuits in the path switching unit 21 of the crossbar switch shown in FIG. 6 are connected with each other through the first and second paths. The first path connects a switch circuit in the m-th stage on the line #n to a switch circuit in the (m+1)-th stage on the line #(n−1), wherein "m" is an integer between 1 and 8, both inclusive ($1 \leq m \leq 8$). For example, in FIG. 6, the switch circuit in the first stage on the line #4 is connected to the switch circuit in the second stage on the line #3 through the first path. For the line #0, the equation n−1 gives the result of "−1" but "7" is used for this value because the equation $0 \leq n \leq 7$ holds. Consequently, the line #0 is connected to the line #7 through the first path. In this way, the value of "n" is circulating as . . . 2, 3, 0, 7, 6, . . . . As to the value "m", the equation $1 \leq n \leq 8$ holds, but the ninth (8+1=9) stage means that the data is leaving the switch circuit in the final stage. Therefore, unlike the value "n", the value "m" is not circulating.

In addition, as described below, the connection format of the first path and the second path in the address initialization unit 20 is such that the paths are linked in the order as follows: first path of the line #0, first path of the line #1, . . . first path of the line #7, as viewed from the input side of the second path of the line #0. Therefore, the designated address can be generated, for example, by operations with the line number of the node line for the input of the line-n output data and the line number of the node line for the output of the line-n output data.

However, in this example, because the designated address is in the form of numerical data with a circulation cycle of 0 to 7, the address initialization unit 20 conducts operations taking into account the circulation cycle of . . . 1->0->7->6 . . . and so on.

As described above, the transition from the phase data "0" to the phase data "1" is carried out once all the address bits have flown through. Therefore, in FIGS. 6 and 8 to 22, the phase data remains "0" while the address bit (three bits in this embodiment) is flowing through the switch circuits in the path switching unit 21. On the other hand, the data flows after all the address bits have flown through. Therefore, the phase data remains "1" while the data is flowing.

When the phase data is "1", each switch circuit always produces, through the first path output terminal OUTa thereof, the input to the first path input terminal INa, regardless of the value of the carry bit. Thus, it is ensured that the data supplied to the switch circuit in the m-th stage on the line #n through the first path (the switch circuit in the first stage is supplied with the data from the address initialization unit) flows at least from the first path input terminal INa to the first path output terminal OUTa of the and then to the switch circuit in the next stage, i.e., the (m+1)-th stage, on the next line, the line #(n−1), provided that "n" is an integer between 0 and 7, both inclusive ($0 \leq n \leq 7$) and "m" is an integer between 1 and 8, both inclusive ($1 \leq m \leq 8$).

For example, in FIG. 6, the data #4 is supplied to the switch circuit in the first stage on the line #4 through the address initialization unit AINI-4. The switch circuit in the first stage on the line #4 transfers the data #4 to the switch circuit in the second stage on the line #3 through the first path. The switch circuit in the second stage on the line #3 transfers the data #4 to the switch circuit in the third stage on the line #n through the first path. Likewise, the data #4 flows the switch circuit in the fourth stage on the line #1, the switch circuit in the fifth stage on the line #0, the switch circuit in the sixth stage on the line #7, the switch circuit in the seventh stage on the line #6, and the switch circuit in the eighth stage on the line #7. As apparent from the above, the data #4 is ensured to flow through one switch circuit for each line through the first path. The same applies to the remaining data. The data #0 to #3 and the data #5 to #7 flow one switch circuit for each one of the lines. This is the flow of the data through the first path of the present crossbar switch.

Next, the second path of the present crossbar switch is described. The second path of the crossbar switch provides connection between the switch circuits on the same line. This is described for the case of the line 4 in FIG. 6 as an example. The thick line, extending from the AINI-4 to the denotation of the "line #4" at the bottom of the figure in the direction depicted by the arrow, corresponds to the second path. Therefore, the data flowing through the second path passes the switch circuits in the first, second, third, . . . , eighth stages on the same line.

In this embodiment, in order to produce data #x as the line-n output data from the switch circuit in the eighth stage on the line #n, the following processing is made to allow the data #x to be produced over the line #n.

First, the switch circuit that receives the data #x through the first path is specified from the switch circuits in the first to eighth stages on the line #n of the path switching unit 21. How the switch circuit is specified is described later. The specified switch circuit transfers the data #x received through the first path to the switch circuit in the next stage on the same line through the second path. The switch circuits in the stages following the specified switch circuit transfer the data #x received through the second path to the switch circuit in the next stage through the second path. The similar procedure is repeated until the switch circuit in the eighth stage receives the data #x through the second path and produces the received data #x therefrom. In this manner, the data #x is actually produced from the switch circuit in the eighth stage as the line-n output data.

In this embodiment, each switch circuit has two outputs, the first path output terminal OUTa and the second path output terminal OUTb, as clearly shown in FIG. 7. The switch circuit in the eighth stage produces the data #x only through the second path output terminal OUTb. However, it is arbitrary which one of the output terminals OUTa and OUTb is used for the data output from the switch circuit in the eighth stage. The data #x may be produced only through the first path output terminal OUTa, or through both output terminals.

Next, the crossbar switch is described in conjunction with the individual lines. Each line has eight switch circuits thereon. The switch circuits in the first stage on these lines receive different data from each other through their respective first path. This is described more specifically as to which one of the data #0 to #7 is supplied to the switch circuits in each stage on the line #4 in FIG. 6. The switch circuit in the first stage on the line #4 is supplied with the data #4 through the AINI-4. In this embodiment, the data #4 is received by the first path input terminal INa of the switch circuit in the first stage. The switch circuit in the second stage is connected to the switch circuit in the first stage on the line 5 through the first path. Therefore, the data #5 supplied from the address initialization unit of the line #5 to the switch circuit in the first stage on the line #5 is transmitted from the switch circuit in the first stage on the line #5 to the switch circuit in the second stage on the line #4 through the first path. In other words, the first path input terminal INa of the switch circuit in the second stage on the line #4 receives the data #5. Likewise, the first path input terminal INa of the switch circuit in the third stage on the line #4 receives the data #6. The first path input terminals INa of the switch circuits in the fourth, fifth, sixth, seventh, and eighth switch circuits of the line #4 receive the data #7, #0, #1, #2, and #3, respectively. When a single line is focused on, the data received by the first path input terminals INa of the switch circuits in each stage on the line #n are: data #n for the first stage, data #(n+1) for the second stage, data #(n+2) for the third stage, data #(n+3) for the fourth stage, and so on. Then, the first path input terminals INa of the m-th and eighth stages receive data #{n+(m−1)} and data #(n+7), respectively. It should be noted that the value of {n+(m−1)} is circulating among 1 to 8, like . . . , 7, 8, 1, 2, 3, 4, 5, 6, 7, 8, 1, 2, . . . because, as described above, the "n" is an integer between 0 and 7, both inclusive (0≦n≦7) and "m" is an integer between 1 and 8, both inclusive (1≦m≦8).

As apparent from the above, the switch circuit in the m-th stage is supplied with the data #{n+(m−1)}, regardless of which line the switch circuit locates on. In other words, the equation x={n+(m−1)} is true when the data #x is used as the line-n output data for the line #n. Therefore, the number of stage, "m" to which the data #x is supplied can be given by the equation m=x−n+1.

For example, when the data #7 is the line-6 output data (i.e., x=7) in the switch circuits on the line #6 (i.e., n=6), the number "m" of the stage to which the data #7 is supplied can be obtained by m=(7−6+1)=2. Thus, the data #7 is shown to be supplied to the switch circuit in the second stage. Likewise, when the line-6 output data is the data #5 (i.e., x=5), the equation gives (5−6+1)=0. However, the value of the stage is circulating among 1 to 8, so that the 0-th stage is identical to the eighth stage. Consequently, the data #7 is supplied to the switch circuit in the eighth stage. In FIG. 6, the above-mentioned relationship is true for all the lines and all the stages.

Under such an assumption, the crossbar switch according to this embodiment is configured such that, when the phase data is "1", the carry bit is always "1" in the switch circuit of which first path input terminal INa is supplied with the data #x which is expected to be the line-n output data (the data #7 corresponds to the line-6 output data for the line #6 in FIG. 6, as shown in FIG. 22, and x=7) among the switch circuits on the line #n (e.g., the line #6 in FIG. 6), and that the carry bit is always "0" in the switch circuit of which second path input terminal INb is supplied with the data #x. In principle, the carry bit may be either "0" or "1" for the switch circuits where the above conditions do not hold. In this embodiment, the carry bit has the value of "0" in the switch circuits where the above conditions do not hold.

As described below, the present embodiment achieves the above-mentioned configuration by means of appropriately determining the designated address, phase data, and reset input using the switch circuits each having the structure as shown in FIG. 7. With such a configuration, when the data #x is supplied to the switch circuit on the line #n through the first path input terminal INa of the switch circuit in question, the data #x is produced through the second path output terminal OUTb thereof, regardless of the data received by the second path input terminal INb of the same switch circuit. The data #x produced through the second path output terminal OUTb is then supplied to the switch circuit in the next stage on the same line through the second path input terminal INb thereof. The carry bit has the value of "0" in the switch circuit which is supplied with the data #x over the second path, as described above, so that the data #x is transmitted through the second path output terminal OUTb to the switch circuit in the subsequent stage through the second path input terminal INb of that switch circuit. The switch circuits in the subsequent stages pass the data received over the second path to the switch circuit in the following stage on the same line. Therefore, the switch circuit in the eighth stage on the line "n" produces the data #x as the line-n output data.

The data supplied to the address initialization unit on any line can be used as the line-n output data for the line #n. In addition to make a one-to-one correspondence between the line and the data, the same data may be produced through two or more lines. For example, as shown in FIG. 22, the data #4 is produced as the line output data for the lines #4, #7, and #0.

A configuration used to appropriately determine the carry bit as above is described now. In this embodiment, the switch circuit shown in FIG. 7 is used to achieve the above-mentioned configuration, and points of time for determination of a designated address, specification of phase data, change of a carry bit, and input of a reset signal, to achieve the above-mentioned configuration.

In this embodiment, the phase data is "0" during the cross point control phase for address introduction, and the address initialization units on the individual lines provide designated addresses to their associated switch circuits. As described above, the designated address is decremented (reduced) by "1", producing a new designated address, each time a node (switch circuit) is passed. The new designated address is supplied to the associated switch circuit in the next stage. The address initialization unit supplies the designated address and data to the second path input terminal INb and the first path input terminal INa, respectively, of the switch circuit in the first stage. When the phase data is "0", the data "c" from the decrement circuit 502 is produced through the second path output terminal OUTb. As described above, the switch circuit transmits the carry bit when the phase data is "0".

The operation of the switch circuit is described for carry bit transmission in which the designated address is given by one bit. For the purpose of simplicity, the description here is made in conjunction with a single switch circuit. However, it should be understood that the same applies to all other switch circuits in the crossbar switch of the present invention. For the case where the switch circuit is supplied with the carry bit of "0", the switch circuit produces "0" through the second path output terminal OUTb thereof and the carry bit is kept to be "0" when the switch circuit receives an input of "0" through the second path input terminal INb of the switch circuit, the switch circuit produces "1" through the second path output terminal OUTb thereof and the carry bit is kept to be "0" when the switch circuit receives an input of "1" through the second path input terminal INb thereof. For the case where the carry bit is "1", the switch circuit produces "1" through the second path output terminal OUTb thereof and the carry bit remains "1" when the switch circuit receives an input of "0" through the second path input terminal INb thereof, while the switch circuit produces "0" through the second path output terminal OUTb thereof and the carry bit becomes "0" when the switch circuit receives an input of "1" through the second path input terminal INb thereof. More specifically, each switch circuit decrements the bit of the designated address received serially by one bit when the carry bit indicates "1", while no decrementing operation is made when the carry bit indicates "0". Consequently, each switch circuit conducts one-bit reduction (decrement by one) of the designated address received by it serially by one bit. This configuration allows serial input, to a given switch circuit, of the designated address with a value smaller by one than the designated address bit provided in the associated switch circuit in the just previous stage, by subtracting one from the received designated address in each switch circuit.

During the operation of the above-mentioned switch circuit, the carry bit is kept to be "0" regardless of the input through the second path input terminal INb, when the carry bit is "0". On the other hand, when the carry bit is "1", the carry bit is kept to be "1" only when the switch circuit received an input of "0" through the second path input terminal INb thereof, while the carry bit becomes "1" when the switch circuit receives an input of "1" through the second path input terminal INb thereof.

The carry bit has the initial value of "1", and this value becomes "0" when any one of the bits (three bits in this embodiment) of the designated address serially supplied to the switch circuit has the value of "1". Once being "0", then the carry bit does not have the value of "1" again.

The value "0" of the designated address supplied to the switch circuit indicates that all the bits of the subject designated address have a value "0". Under such conditions, the carry bit for the switch circuit in question is kept to be "1". Therefore, the carry bit is kept to be "1" for the switch circuit supplied with the designated address of "0", i.e., "000".

On the other hand, the designated address supplied to the switch circuit has a value other than "0", then at least one of the bits making up of the designated address has the value of "0". The carry bit always has the value "0" after the three-bit address is received by the switch circuits that have received the designated address other than "0".

In this manner, the carry bit is allowed to have the value of "1" only for the switch circuit where all the serially-supplied bits of the designated address have the value of "0". In other switch circuits, the carry bit remains to have the value of "0" even after all the three bits of the designated address have flown through and the data is provided (i.e., after the phase data is changed to "1"). This configuration makes it possible to designate a target switch circuit to which the data #x is supplied through the first path, keep the value of "1" for the designated switch circuit, and change the value of the carry bit for other switch circuits into "0", during the data transfer phase (phase data="1").

On the other hand, such a configuration is described below that can be used to designate, among the switch circuits in the first to eighth stages on the line #n, a switch circuit to which the data #x is supplied through the first path (or the address initialization unit thereof) which the data #x is the one that should be used as the line-n output data, during the data transfer phase.

The address initialization unit on the line #n calculates, for this designation, to which switch circuit in which stage the data #x, the line-n output data, is supplied through the first path (the address initialization unit in the first stage). As described above, the data #x is supplied to the switch circuit in the (x−n+1)-th stage on the line #n. In addition, also as described above, the designated address is decremented by the decrement circuit 502 in FIG. 7 and is then supplied to the switch circuit in the next stage. Therefore, the designated address has been decremented (x−n) times when it is supplied to the switch circuit in the (x−n+1)-th stage. Based on the above, the address initialization unit on the line #n gives the designated address as (x−n).

Now, the description is focused on the individual lines. When the data #6 to the line #6 is the line-1 output data, n=1 and x=6 hold. Therefore, the address initialization unit AINI-1 calculates the value of the designated address as (6−1)=5. The designated address is decremented by one, each time the switch circuits are passed in the first, second, third, fourth, and fifth stages on the line #1. The designated address has a value of "0" when it reaches the switch circuit in the sixth stage, after having been decremented five times. Consequently, the switch circuit in the sixth stage on the line #1 is identified as the target switch circuit to which the data #6, which is the line-1 output data, is supplied through the first path.

In the line #7 (n=7), the data #4 supplied to the line #4 is used as the line-7 output data. Therefore, the value of (x−n) can be given by 4−7=−3. However, the address initialization unit AINI-7 produces the value of "5", i.e., "101" by adding "8" (the number of circulating numerical values) to "−3" (the subtraction result) according to the circulating feature of this crossbar switch. Thus, a calculation results considering the circulation cycle can be obtained by means of performing a modulo operation on the numerical value "8".

By binary subtraction performed serially with, for example, a serial subtractor, the address initialization units can be configured to produce their respective designated address, reflecting the circulating characteristic. It is noted that each address initialization units can refer the line number of the line on which it locates. This may be achieved by, for example, recording the line number on a memory provided in the address initialization unit.

The above-mentioned phase data is supplied to the address initialization unit as well. The address initialization unit AINI-n carries out the above-mentioned operation when the phase data is "0". On the other hand, when the phase data is "1", the address initialization unit AINI-n passes the data #n therethrough to the switch circuit in the first stage.

Next, the basic principle of the subtraction is described. The subtraction is performed serially by one bit for each time when the phase data indicates "0". For example, the above-mentioned address initialization units performs the following processing to subtract "7", i.e., "111", which corresponds to the line number of the line #7, from "4", i.e., "100", which corresponds the data number of the line-7 output data.

First, the address initialization unit AINI-n is supplied with the first bit of the data number ("100" in the example of the address initialization unit AINI-7) of the line-n output data. This input is herein designated as "P" for the simplification purpose. On the other hand, the address initialization unit AINI-n on the line #n reads the first bit of the line number "n" ("111" in the above example) of the line #n. The bit read by the address initialization unit is herein designated as "Q". The address initialization unit AINI-n calculates the equation P−Q−R, wherein "R" represents the carry bit. The address initialization unit AINI-n then supplies the calculation result to the switch circuit in the first stage.

However, in this calculation, the carry bit has a default value of "0". The carry bit is changed to "1" when a negative result is obtained from the calculation, regardless of its state before the calculation. The sum of the calculation result and the value "2" is produced from the address initialization unit AINI-n. This ensures calculation with a serial input by one bit for each.

Figure 8:
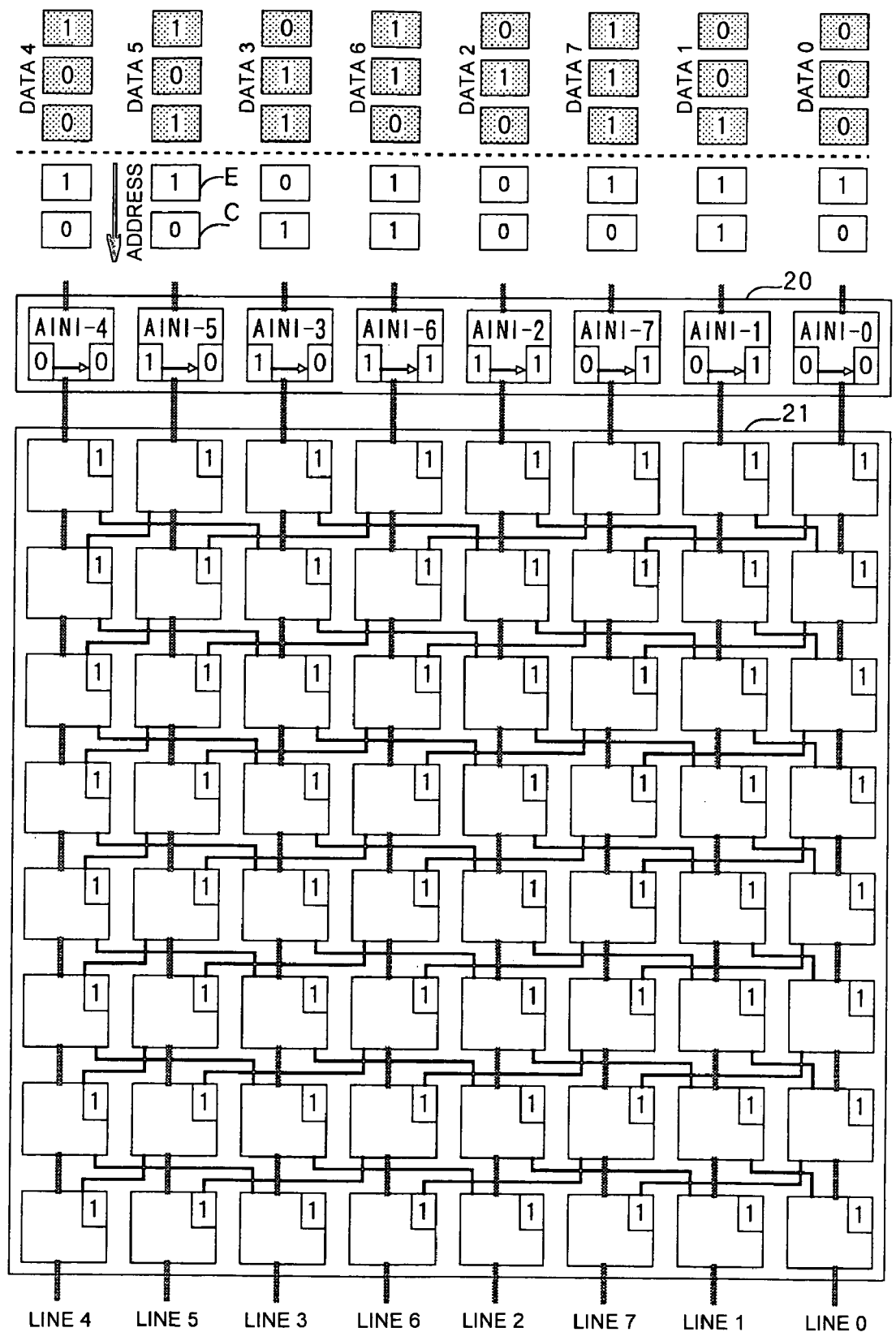
FIG. 8 is a view illustrating the operation of a crossbar switch (cross point control phase)
Figure 9:
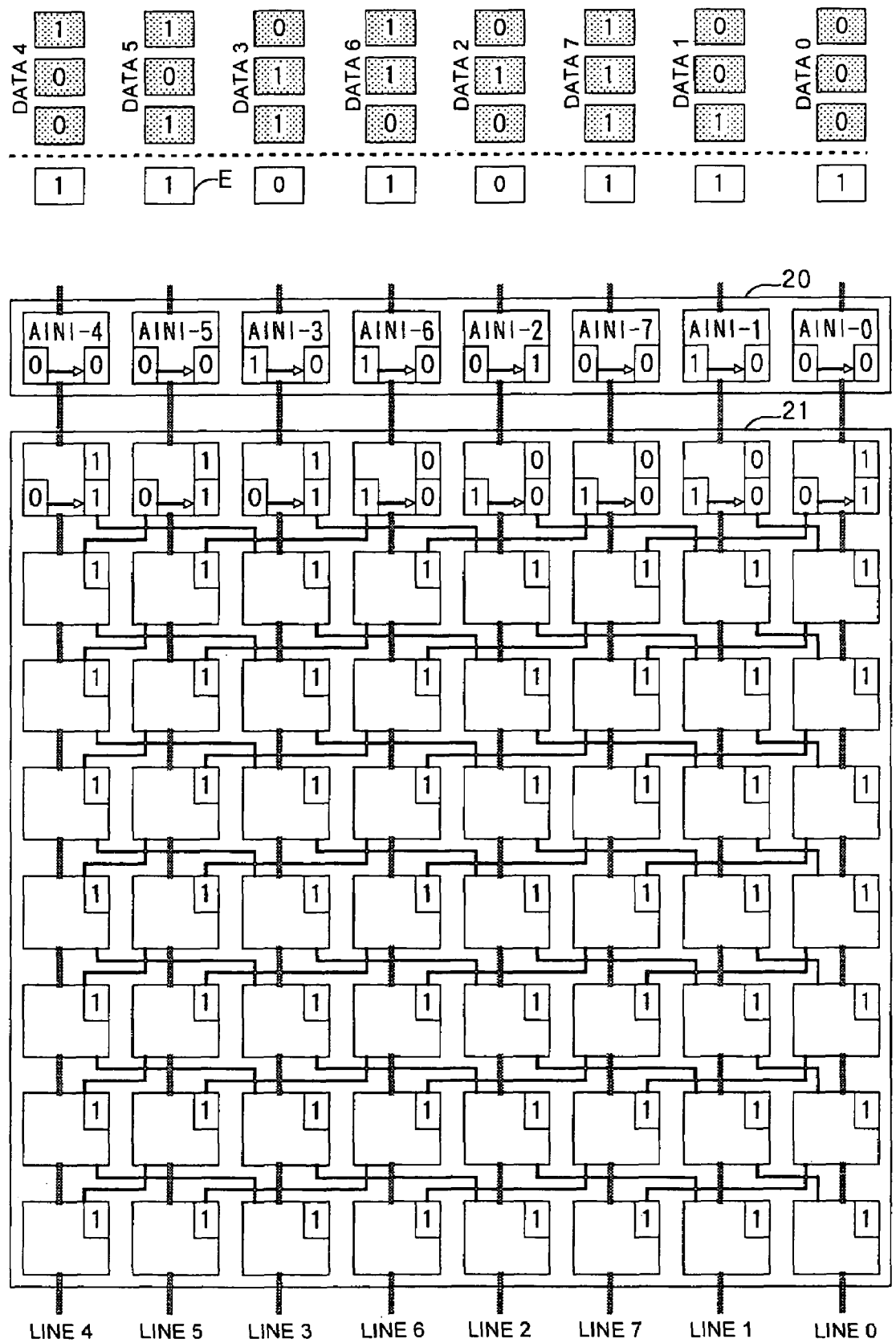
FIG. 9 is a view illustrating the operation of a crossbar switch (cross point control phase)
Figure 10:
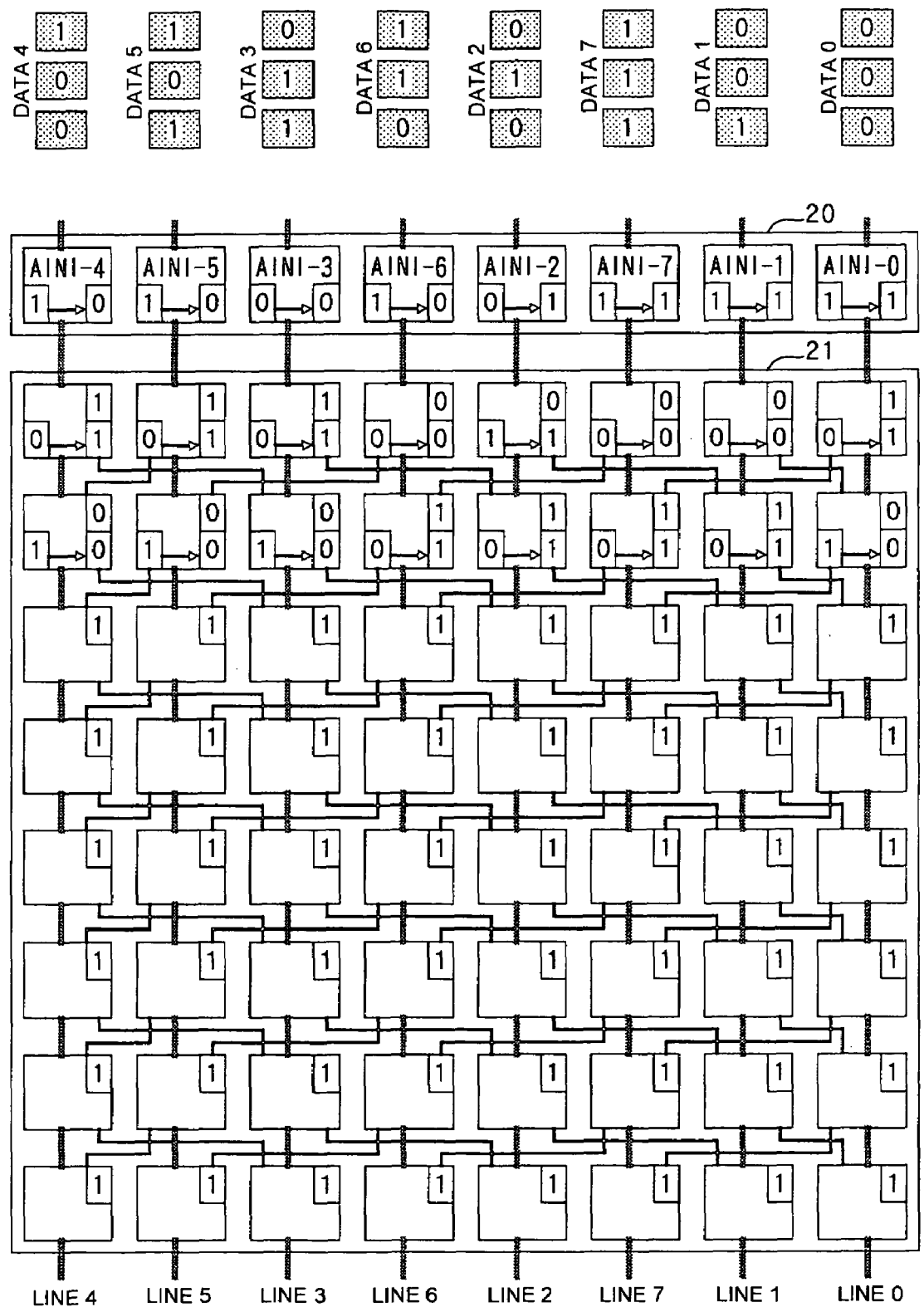
FIG. 10 is a view illustrating the operation of a crossbar switch (cross point control phase)

FIG. 8 illustrates a state in which the control start bit S is supplied to the address initialization unit 20 to start the cross point control phase. FIG. 9 illustrates a state in which the control bit C which is the second bit of the serial data (address) is supplied to the address initialization unit 20, following the least significant bit, and the least significant bit is supplied to the switch circuit 50 in the first stage. FIG. 10 illustrates a state in which the control end bit E, i.e., the most significant bit of the serial data (address) is supplied to the address initialization unit 20, the least significant bit is supplied to a switch circuit 50 in the second stage, and the second bit is supplied to the switch circuit 50 in the first stage.

The numeral value obtained at the point of time when all three bits have passed through the address initialization unit 20 represents the above-described subtraction result.

In FIG. 8, description is made for the line #7 as an example. The value, x=4, can be derived from the data #4 which is the line-7 output data, while the value, n=7, can be derived from the line number, 7. The address initialization unit AINI-7 is supplied with the least significant bit "0" of the value 4, "100", given by the equation x=4. The address initialization unit AINI-7 reads the least significant bit "1" of the value 7, "111", from the above-mentioned memory and subtracts 1 from 0. Then, the address initialization unit AINI-7 subtracts the default value "0" of the carry bit.

The subtraction result is 0−1−0=−1. As described above, the switch circuit in the first stage is supplied with the value "1", which is obtained by adding 2 to the subtraction result of −1, as the least significant bit of the designated address (corresponding to the indication "0->1" in the AINI-7 in FIG. 8). Though not being illustrated in the figure, the carry bit has a value of "1" according to the above-mentioned principle because the calculation result has a negative value.

Turning to FIG. 9, the address initialization unit AINI-7 is supplied with the second bit, "0" of the value x="100". The second bit "1" of the value n="111" is read from the memory for the subtraction. The calculation result is given as 0−1−1=−2 because the carry bit has a value of "1".

According to the above-mentioned principle, the switch circuit in the first stage is supplied with the value "0", which is obtained by adding 2 to the subtraction result (corresponding to the indication "0->0" in the AINI-7 in FIG. 9).

In FIG. 10, the address initialization unit AINI-7 is supplied with the most significant bit "1" of the value x="100". The most significant bit "1" of the value n="111" is subtracted from it and then the value "1" of the carry bit is also subtracted therefrom. The calculation result is given as 1−1−1=−1. However, the value of "1" is produced by adding 2 to the subtraction result, based on the above-mentioned principle. This specifies the third bit of the designated address, i.e., "1" (corresponding to the indication "1->1" in the AINI-7 in FIG. 10). These operations produce the designated address of "101", indicating "5". As apparent from the above, by the use of the carry bit, it is possible to provide the result of subtracting the line number "n" from the data number "x" of the line-n output data.

When a fourth bit of the serial data (data to be subjected to transmission) is thereafter supplied to the address initialization unit 20, the control end bit E of the designated address is supplied to the switch circuit 50 in the first stage of the path switching unit 21. This state is shown in FIG. 11.

Figure 11:
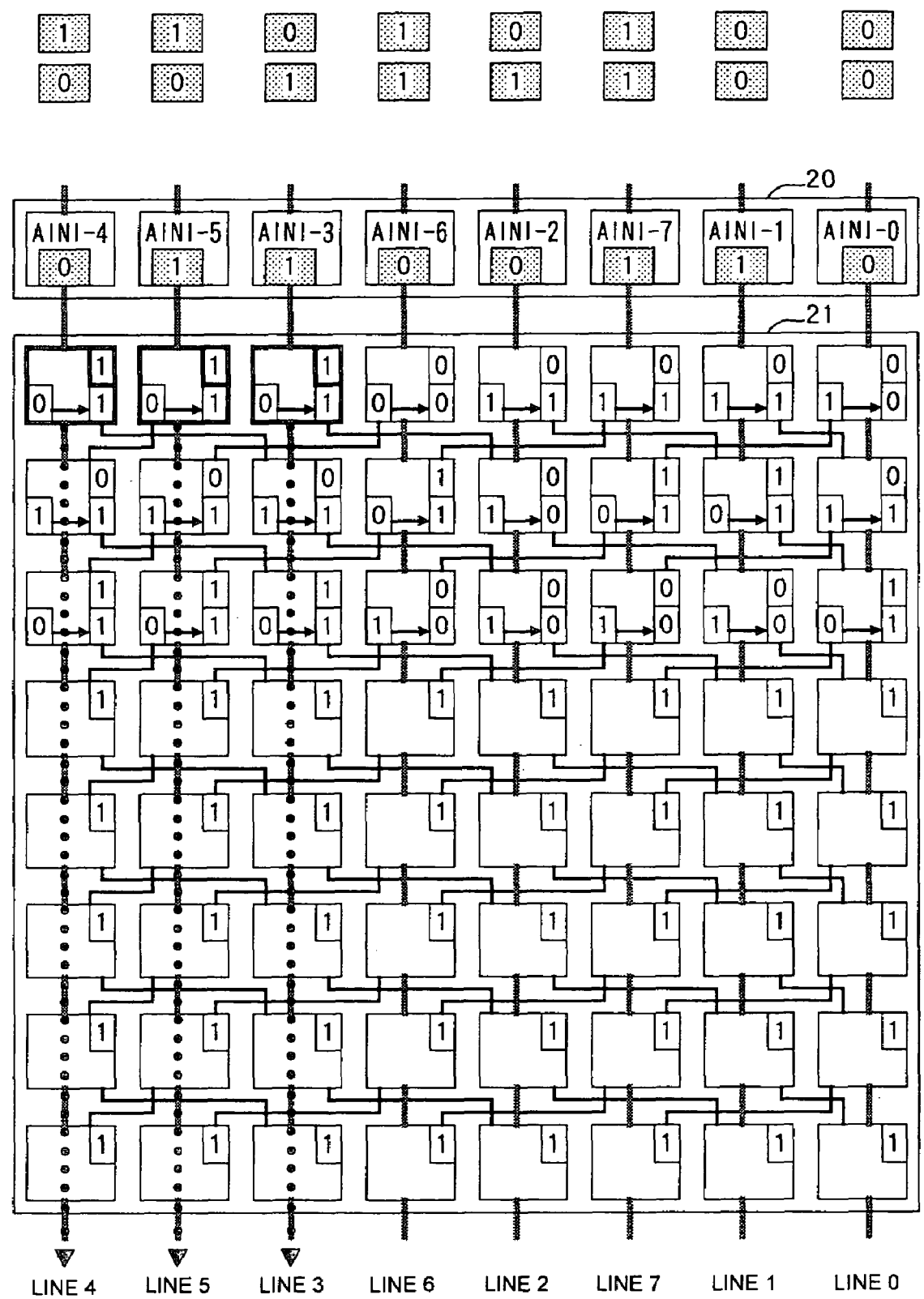
FIG. 11 is a view illustrating the operation of a crossbar switch (cross point control phase)

In FIG. 11, the carry bit of the switch circuits 50 in the first stage of the lines #4, #5, and #3 is "1". Therefore, as described hereinabove, in those lines #4, #5, #3, the switch circuits 50 in the first stage become designated as the switch circuits for conducting data transfer. Therefore, in those switch circuits 50, the serial data flowing in the first path will be transferred to the second path, and the respective data will directly pass through the switch circuits 50 of subsequent stages of the same node lines (second path) till they reach the output ports.

Figure 12:
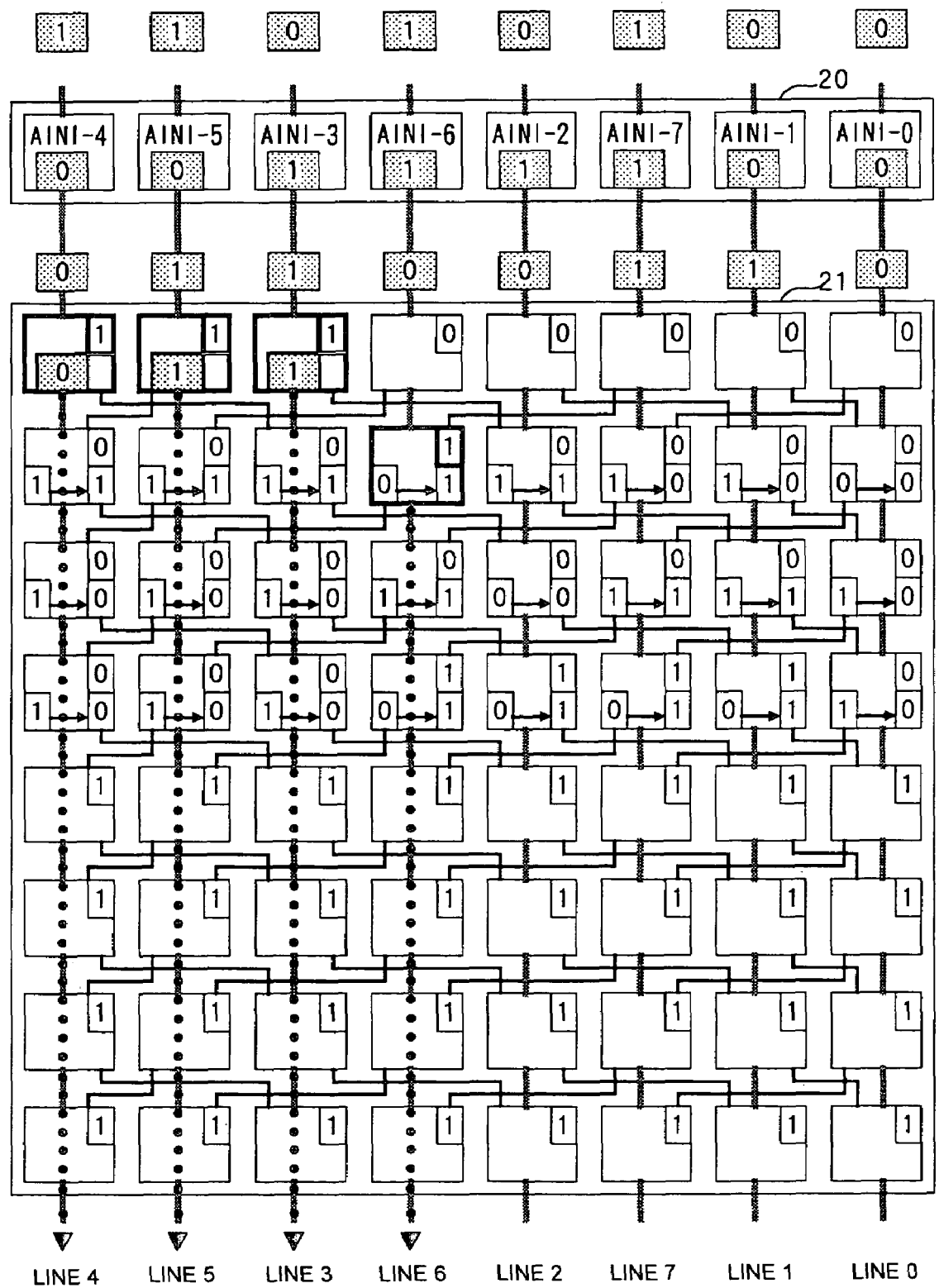
FIG. 12 is a view illustrating the operation of a crossbar switch (cross point control phase)

FIG. 12 illustrates a state in which the switch circuit 50 in the second stage on the line #6 is designated as a switch circuit for conducting data transfer.

Figure 13:
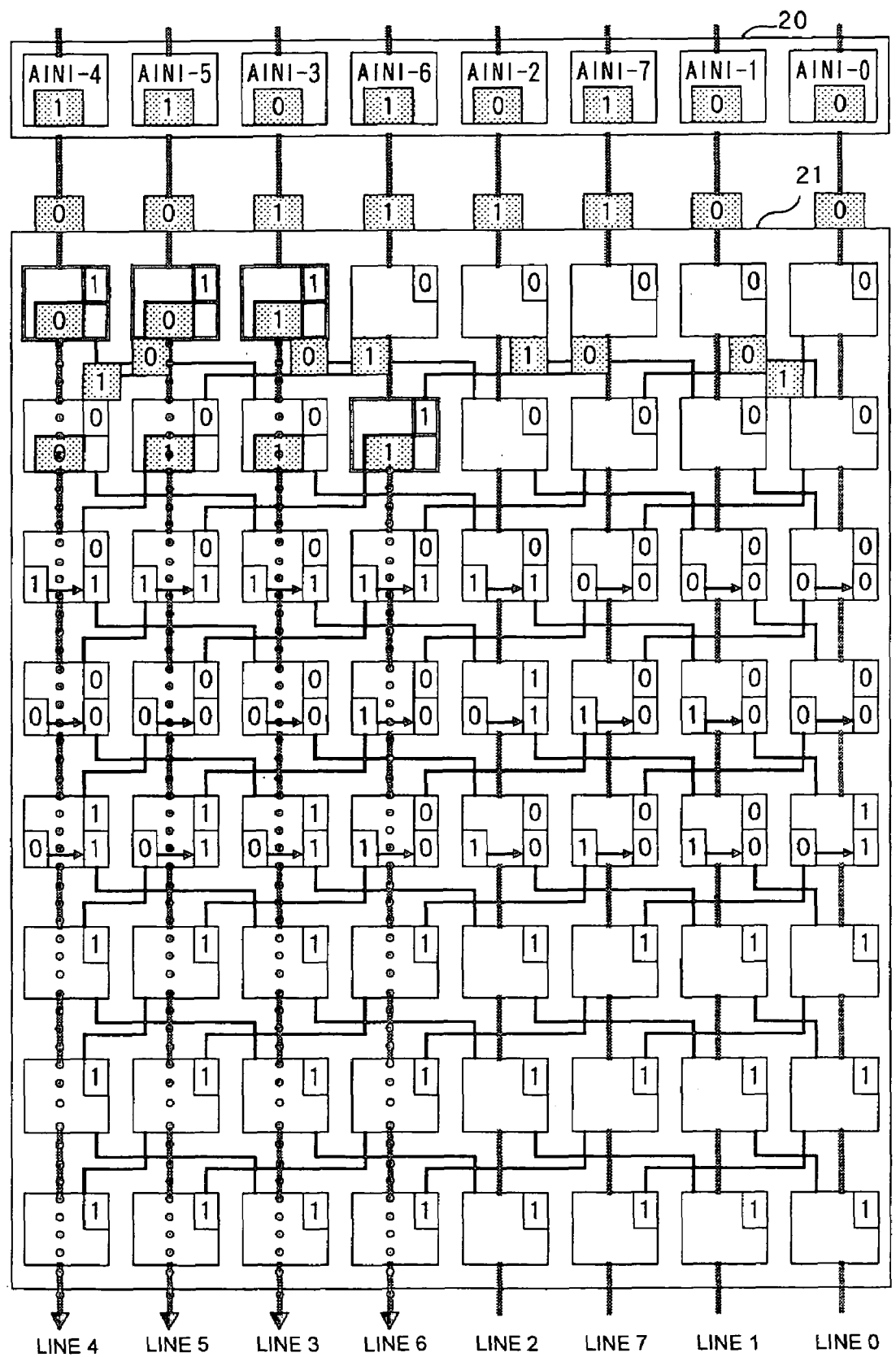
FIG. 13 is a view illustrating the operation of a crossbar switch (cross point control phase)
Figure 14:
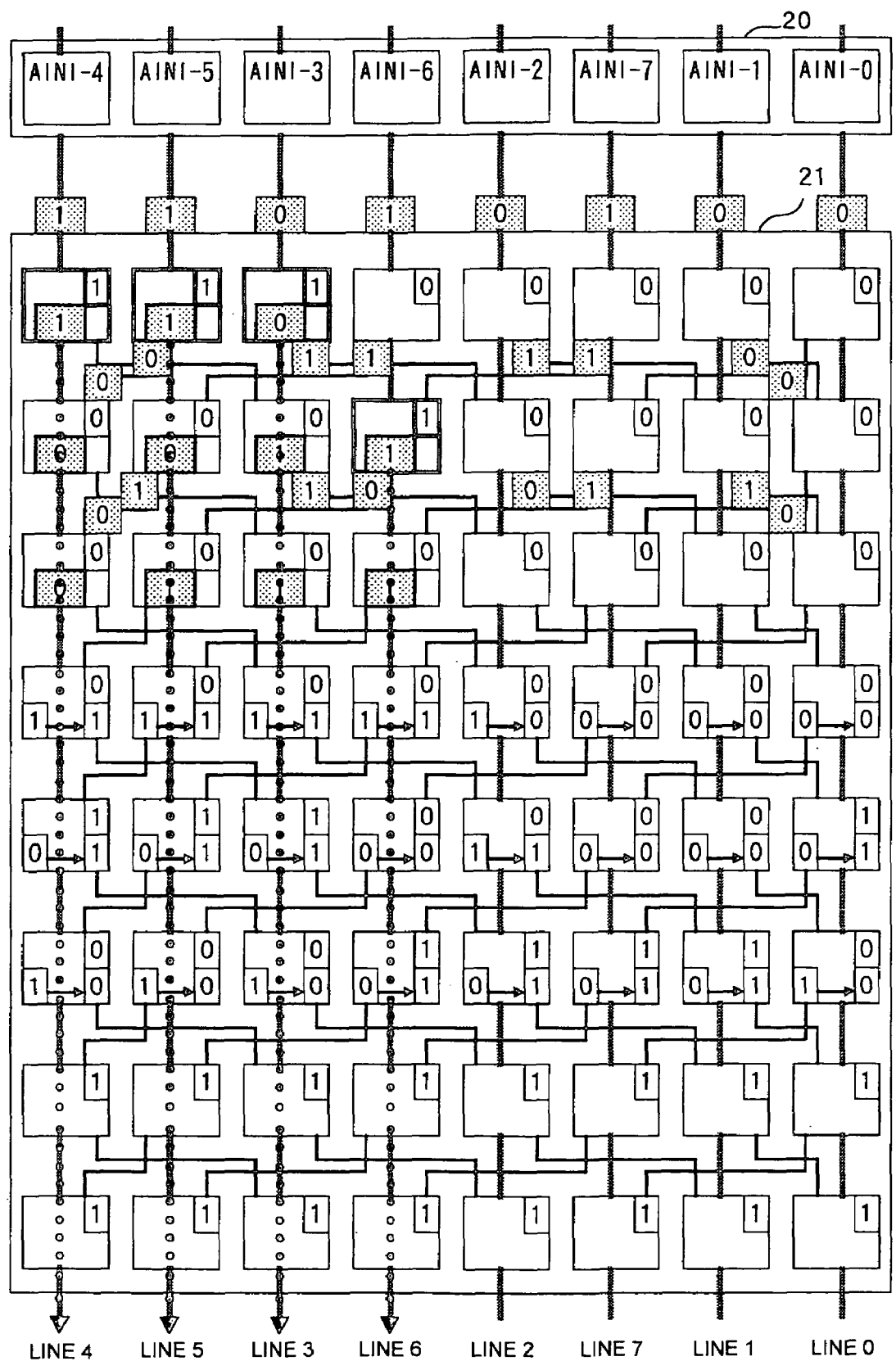
FIG. 14 is a view illustrating the operation of a crossbar switch (cross point control phase)
Figure 15:
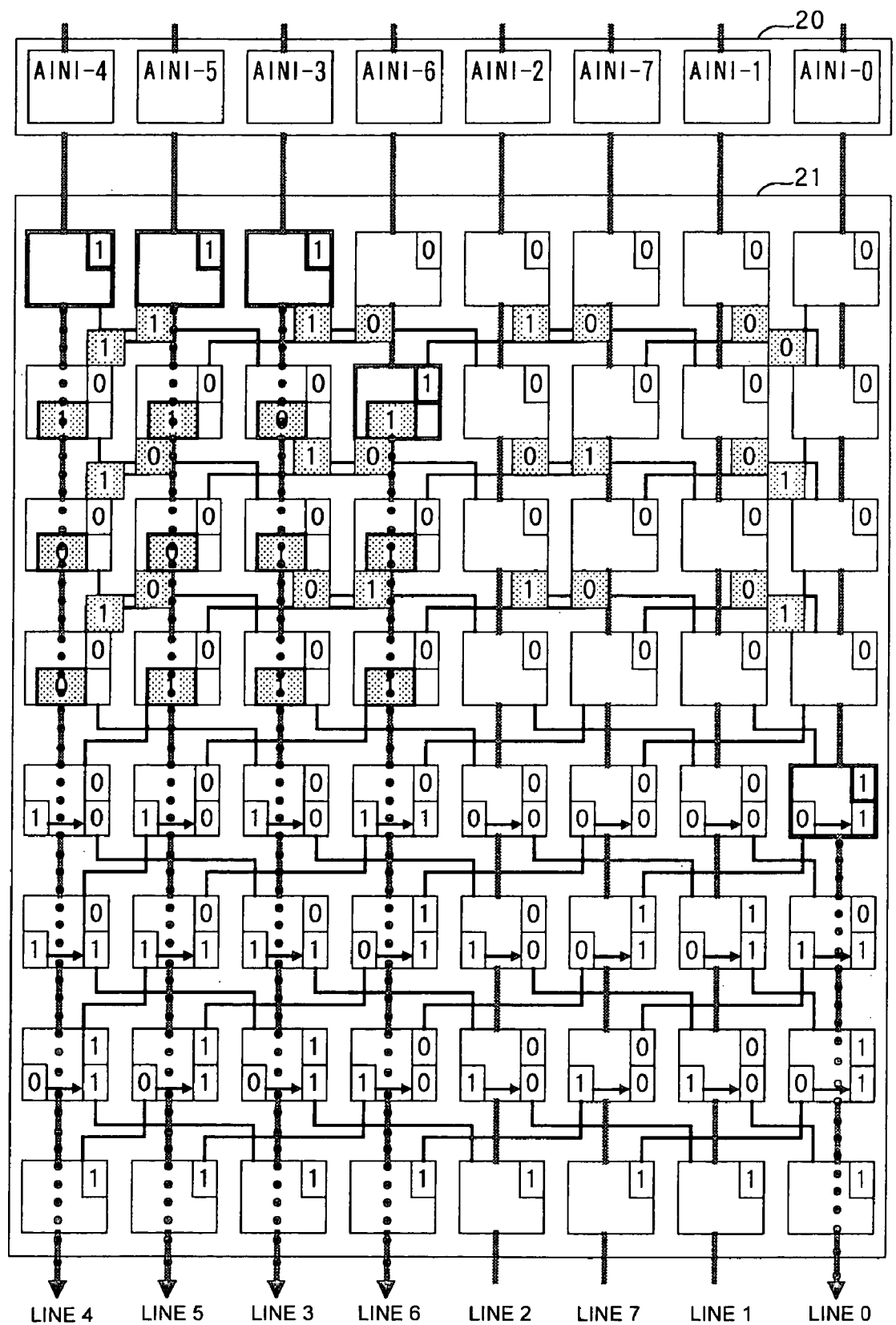
FIG. 15 is a view illustrating the operation of a crossbar switch (cross point control phase)

Then, as shown in FIG. 13 and FIG. 14, serial data are transmitted stage by stage, and in the state shown in FIG. 15, the switch circuit 50 in the fifth stage on the line #0 is selected as the switch circuit for conducting data transfer.

Figure 16:
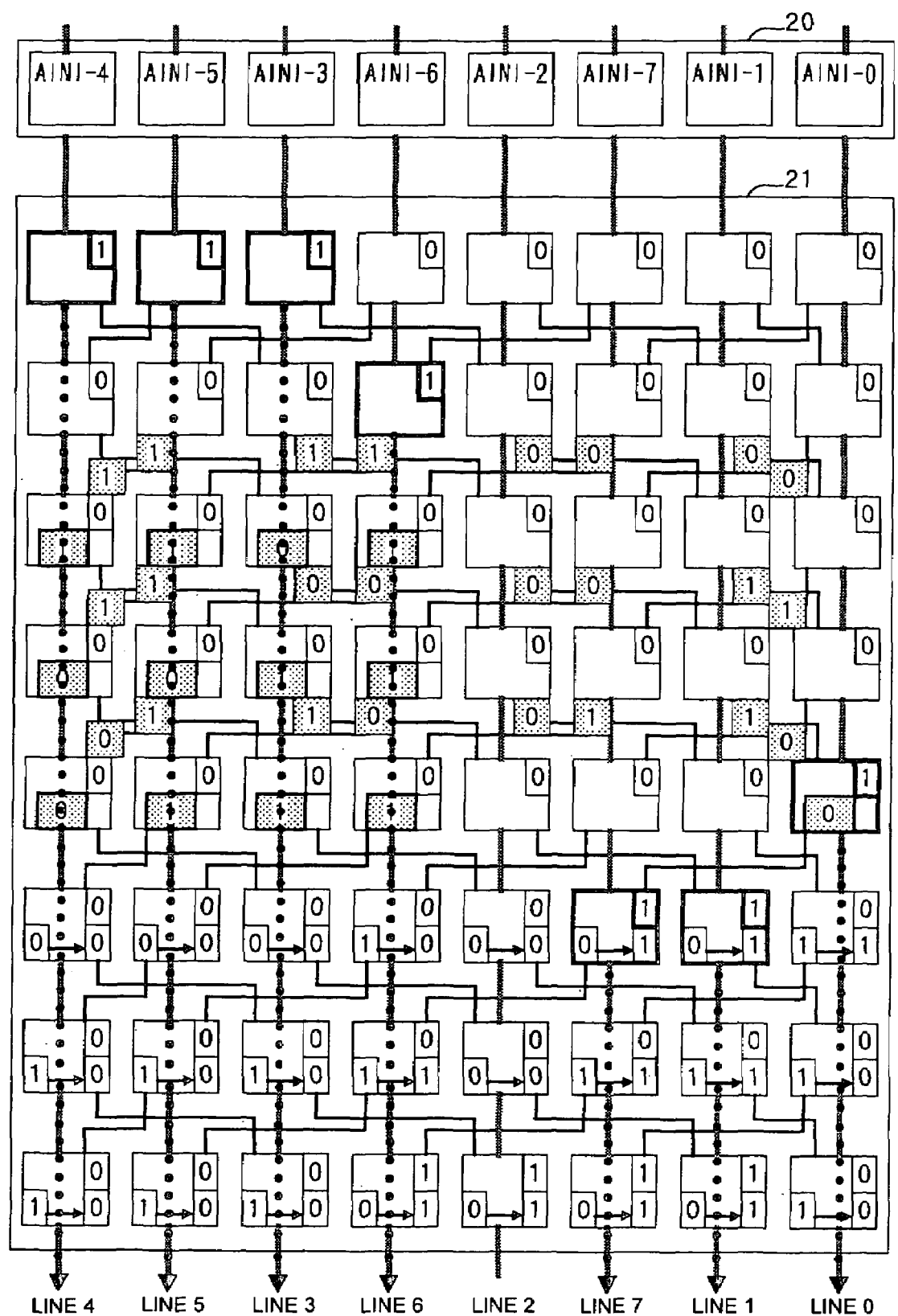
FIG. 16 is a view illustrating the operation of a crossbar switch (cross point control phase)

In the state shown in FIG. 16, the switch circuits 50 in the sixth stage on the line #1 and the line #7 are designated as switch circuits for conducting data transfer.

Figure 17:
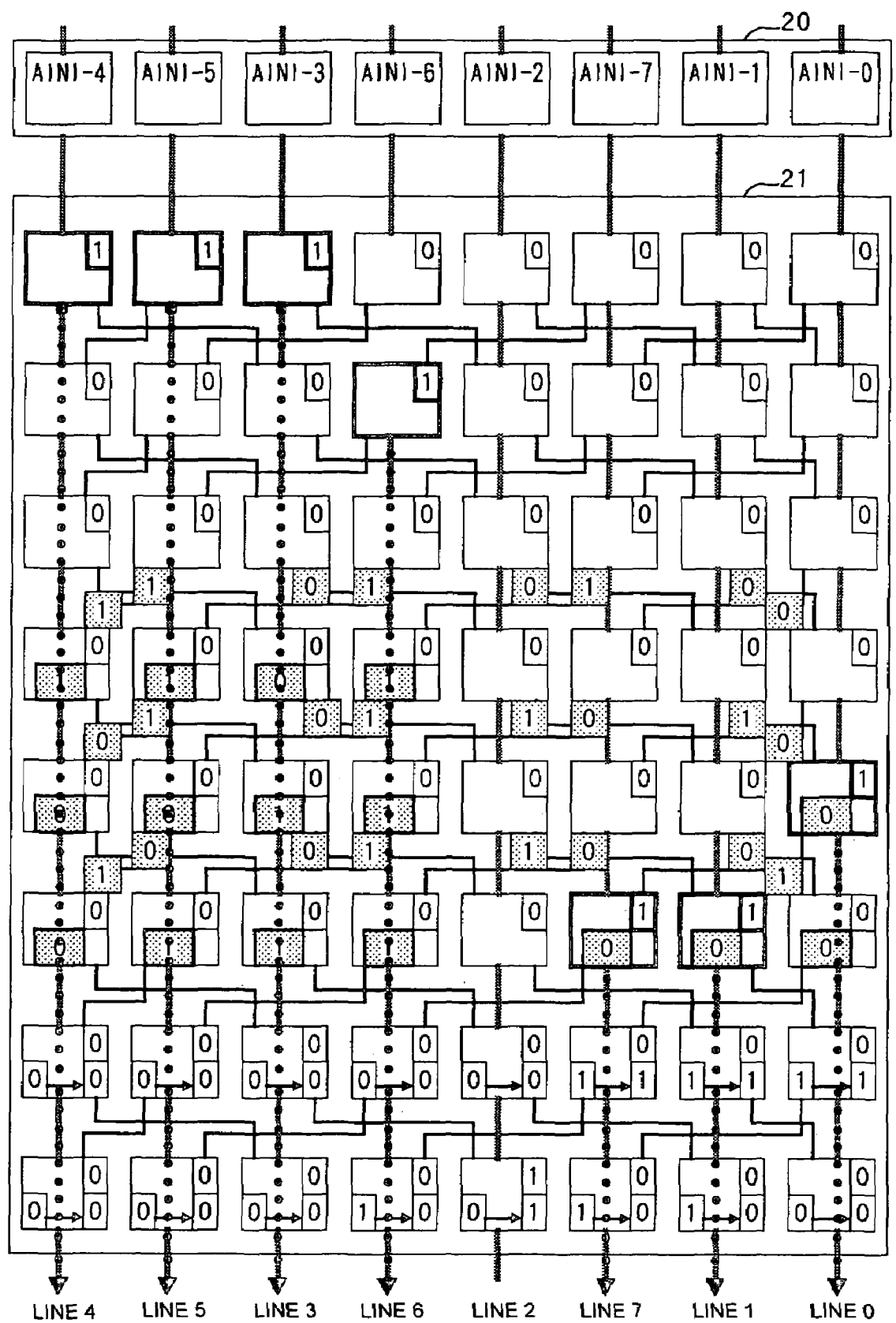
FIG. 17 is a view illustrating the operation of a crossbar switch (cross point control phase)
Figure 18:
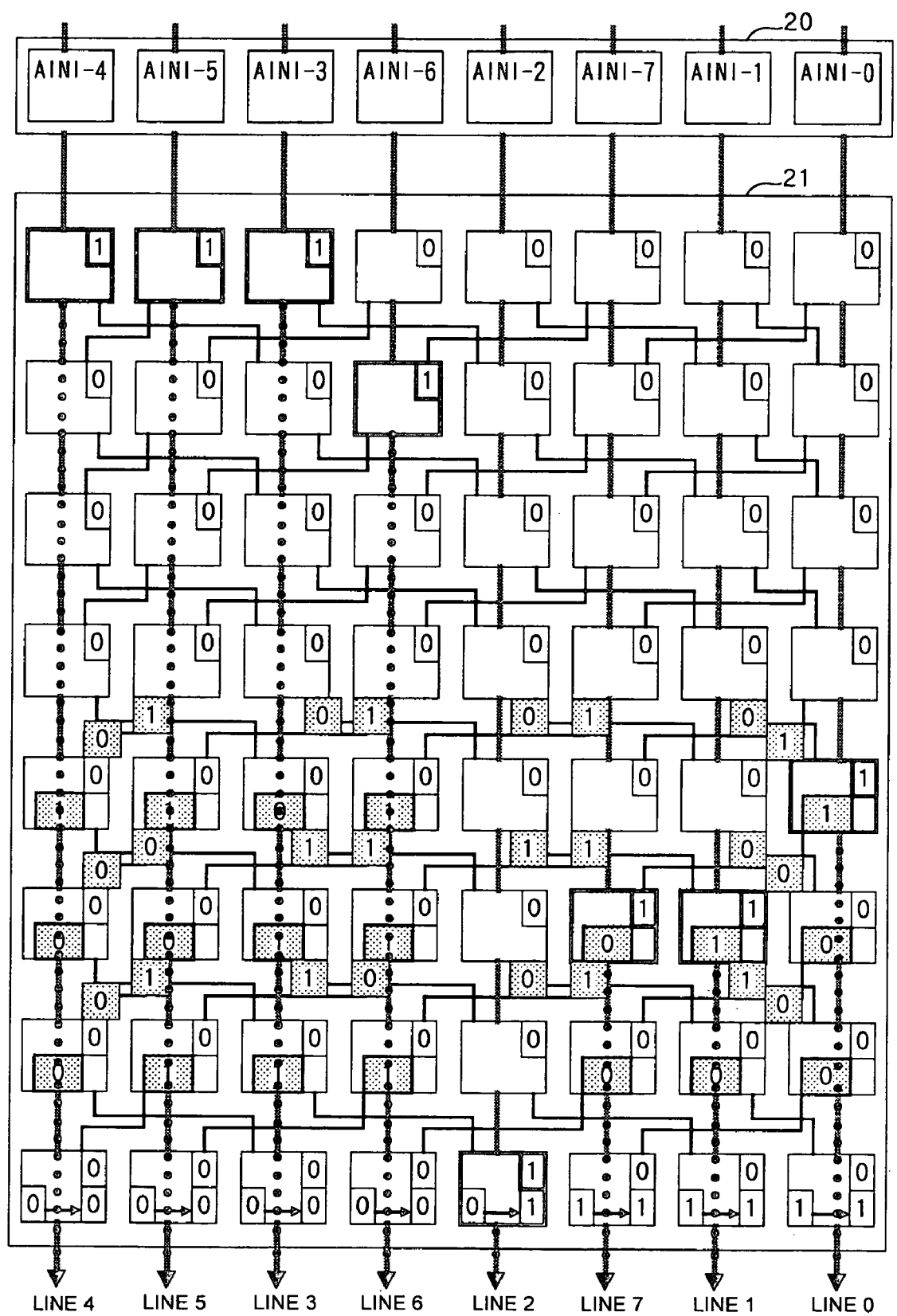
FIG. 18 is a view illustrating the operation of a crossbar switch (cross point control phase)
Figure 19:
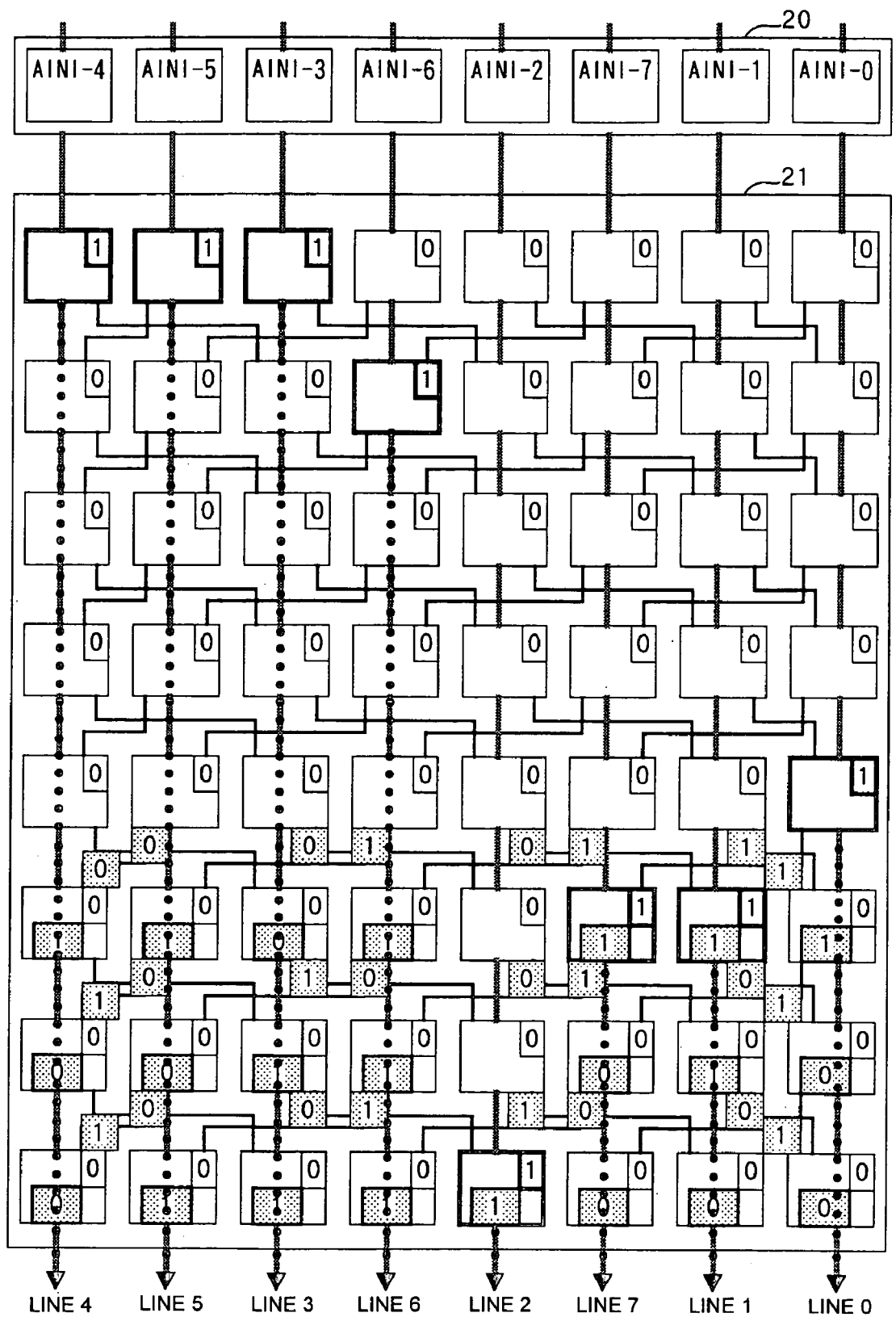
FIG. 19 is a view illustrating the operation of a crossbar switch (data transfer phase)
Figure 20:
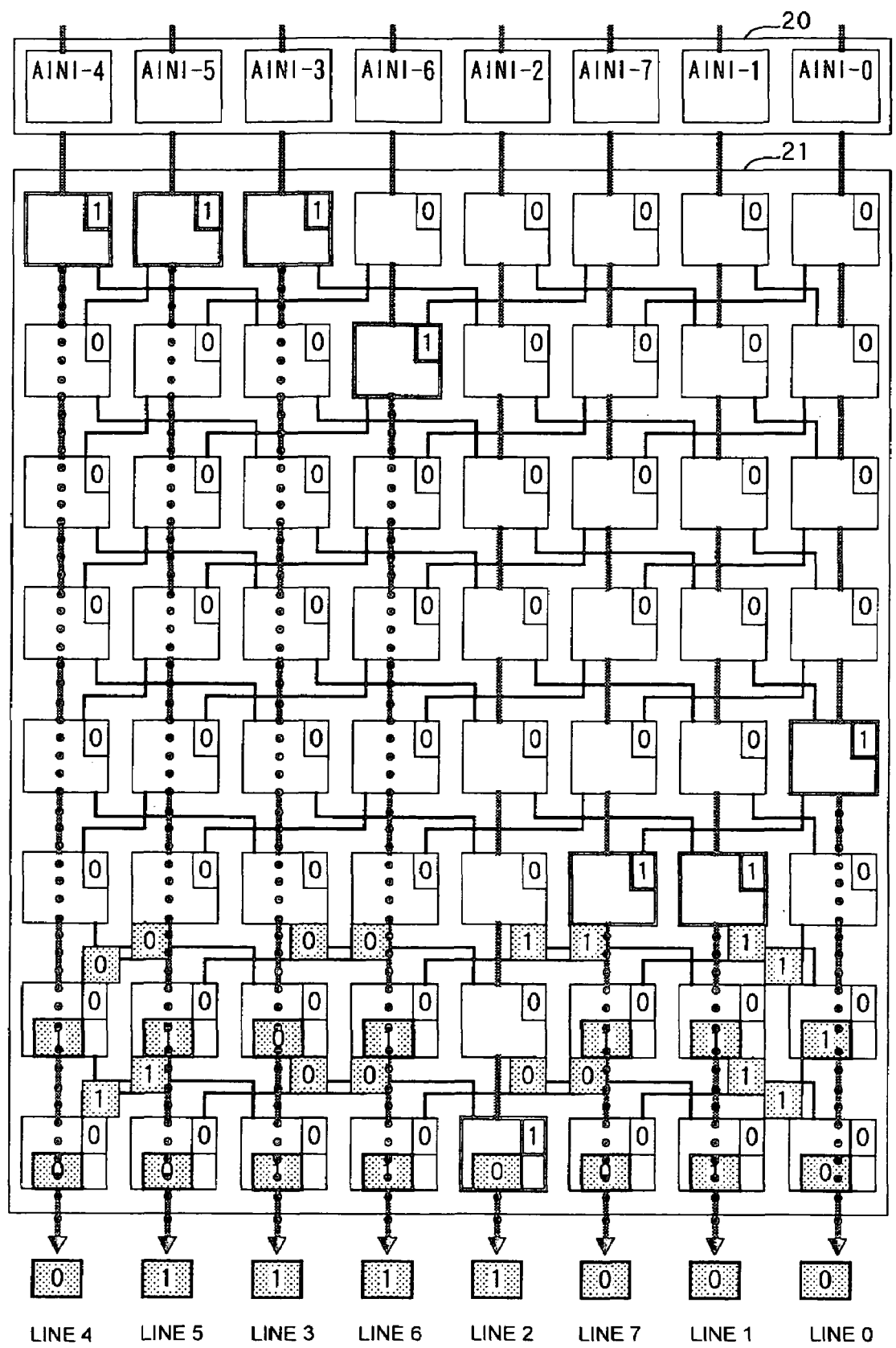
FIG. 20 is a view illustrating the operation of a crossbar switch (data transfer phase)
Figure 21:
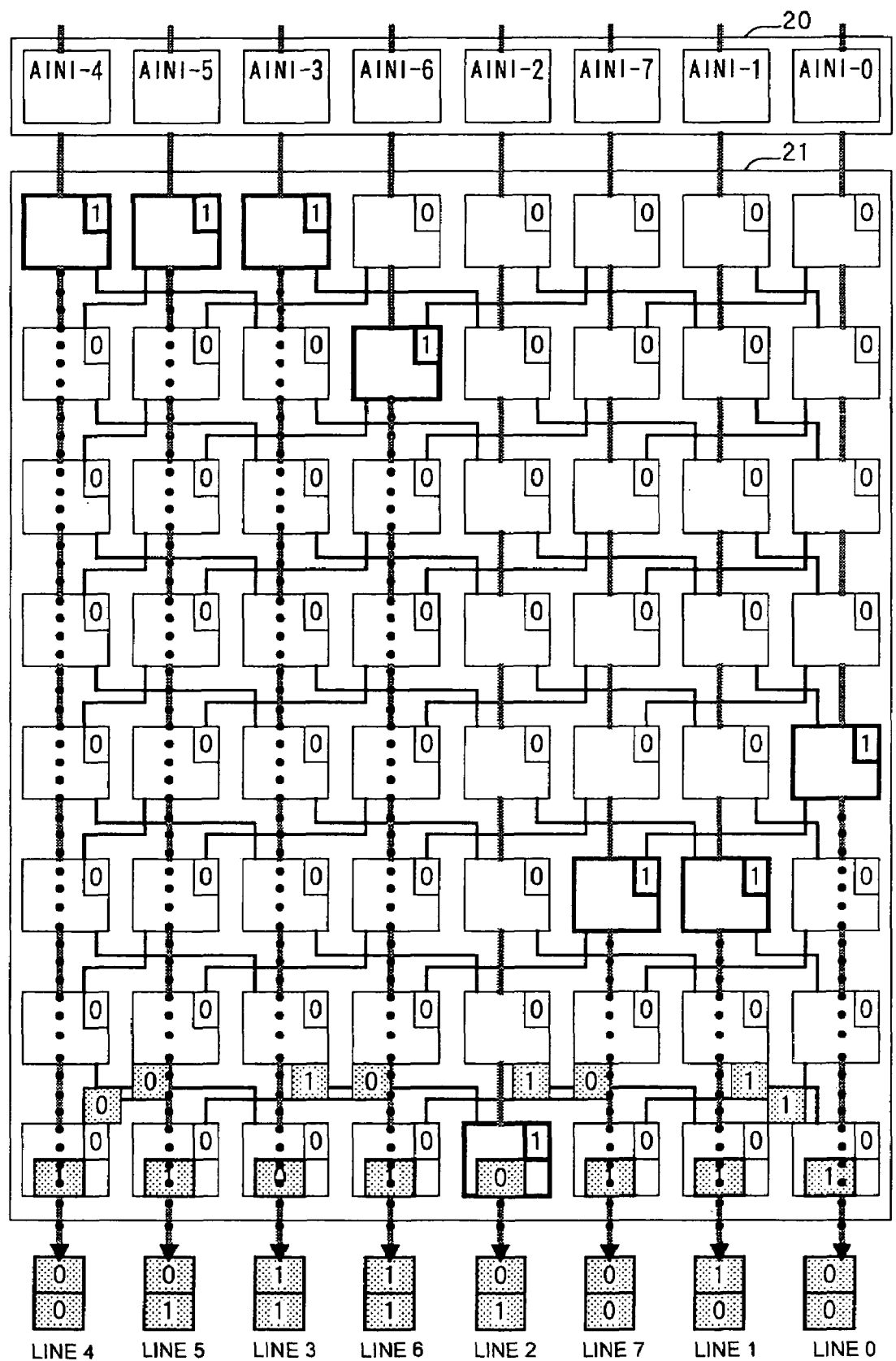
FIG. 21 is a view illustrating the operation of a crossbar switch (data transfer phase)

Furthermore, following the state shown in FIG. 17, in the state shown in FIG. 18, the switch circuit in the lowermost stage on the line #2 is designated as the switch circuit 50 for conducting data transfer.

Thus, if the input of all the address bits of the designated address in the respective switch circuits 50 on each node line is ended, the processing flow enters the data transfer phase from the next operation timing. In a short time, the data pass through the switch circuits 50 in the order shown in FIGS. 19 to 21 and are produced bit by bit from the output end of each node line.

FIG. 22 shows which path is selected to pass those serial data and in which state the data are eventually produced from the output port.

Thus, in the crossbar switch of the second embodiment, because the data transfer phase and the cross point control phase are separated, a line for data output and a control line for the cross point control can be shared, the number of lines in the crossbar switch can be greatly reduced, and the crossbar switch can be miniaturized.

Furthermore, conducting wiring so that the distance between the nodes becomes the same or almost the same makes it possible to expand thereafter the scale of the crossbar switch by multistage connection via interface components.

Furthermore, because the cross point control can be conducted almost at the same time as data transfer with the instruction array, faster data transfer processing can be implemented in the case of processing with a small ratio of cross point control phase.

The crossbar switch of the second embodiments can be practically used in a variety of modes.

Figure 23:
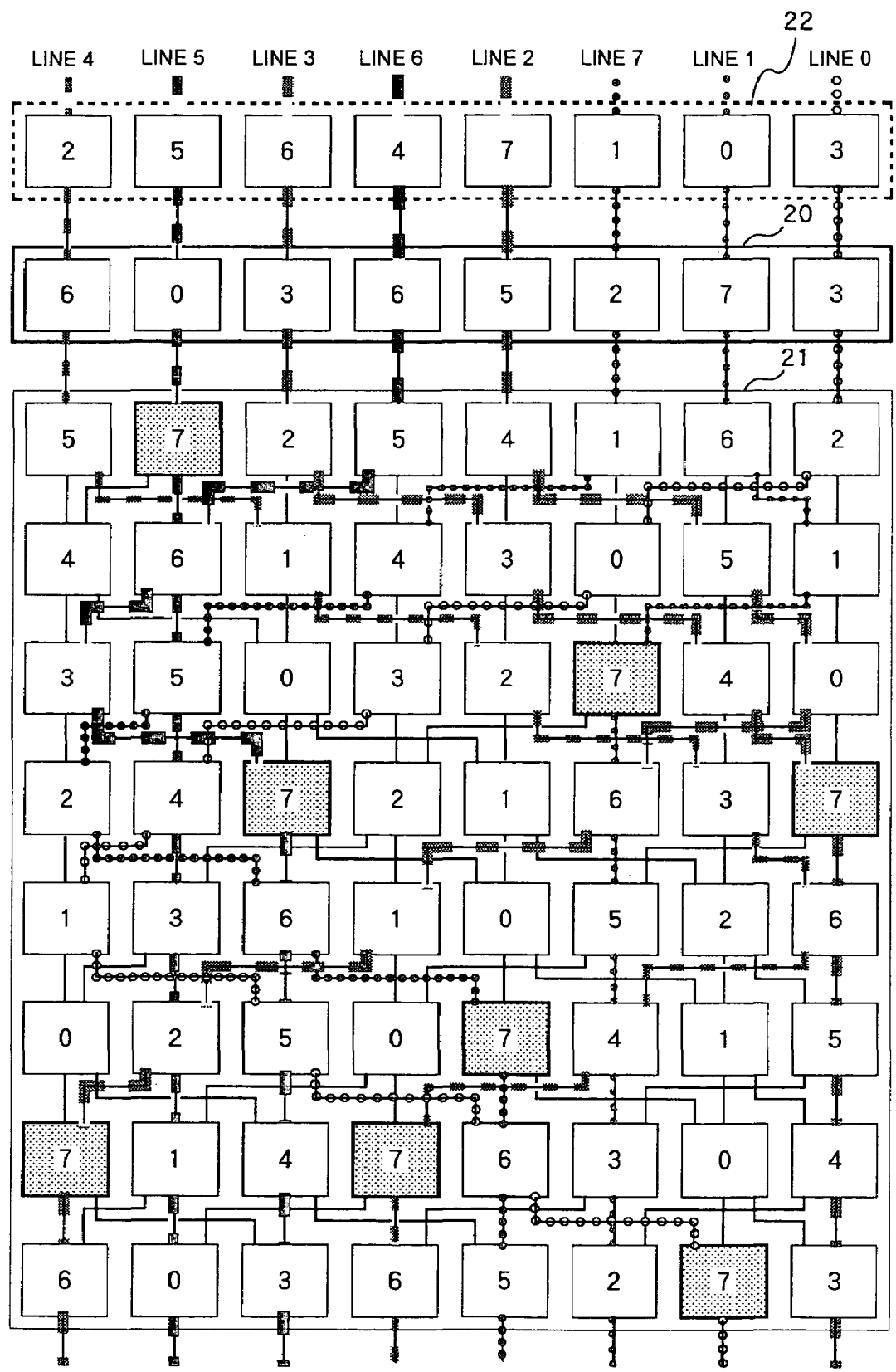
FIG. 23 is a schematic view illustrating a typical operation state of a crossbar switch.
Figure 24:
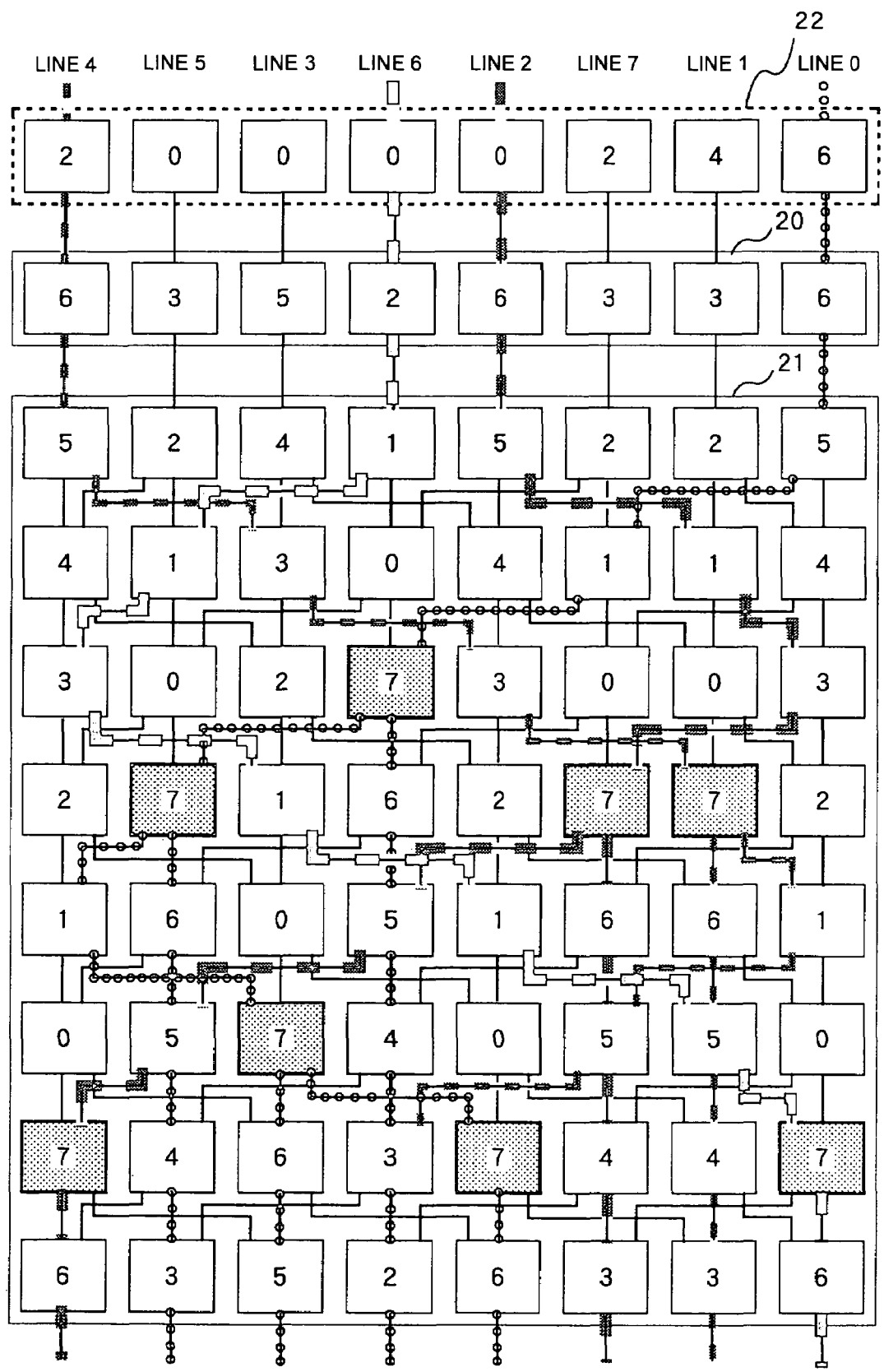
FIG. 24 is a schematic view illustrating the operation state of a multicast system.
Figure 25:
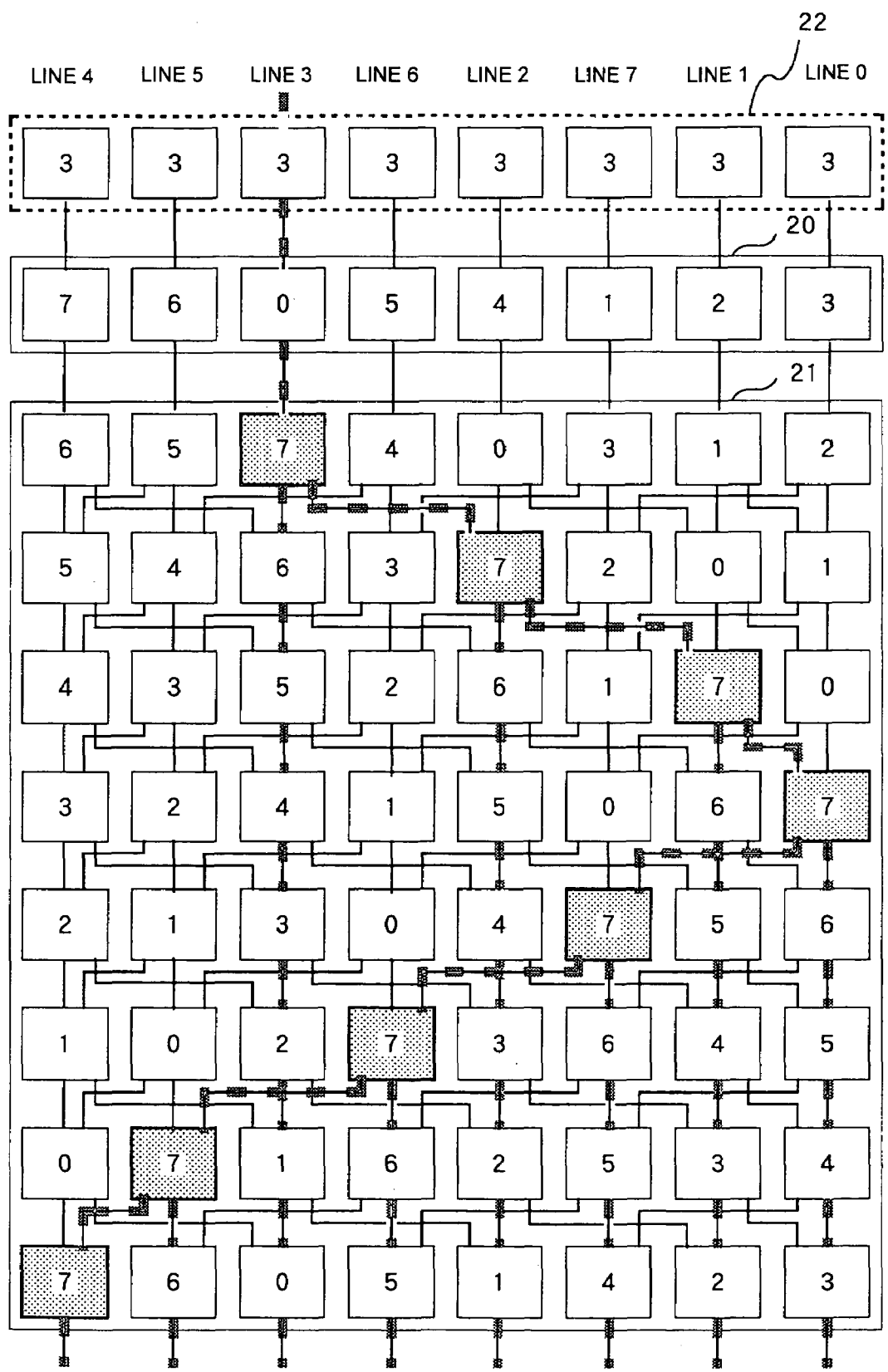
FIG. 25 is a schematic view illustrating the operation state of a broadcast system.

For example, in addition to the general way of crossbar switch utilization such as shown in FIG. 23, the multicast system shown in FIG. 24 and a broadcast system shown in FIG. 25 can also be easily implemented with the crossbar switch of this embodiment.

In those drawings, numerical values of the regions depicted by reference numerals 22 are the line numbers of the node lines that are used for the input of data that are desired to be produced from those node lines, and the numerical values in the path switching unit 21 are the addresses of the switch circuits 50 of the node lines. The numerical values written on the switch circuits 50 are the addresses that are decremented there. The numeral values in the address initialization units 20 are the designated addresses and are derived, as described hereinabove, by subtracting line numbers of the node lines where data flows from the line numbers of the node lines which are desired to be used for the output.

FIG. 24 illustrates the case in which the data supplied from the input end of the node line identified by the line number 0 are produced at the same time from the line #2, line #3, line #5, and line #6, and the data supplied from the input end of the node line identified by the line number 2 are produced from the line #4 and the line #7.

FIG. 25 illustrates the case in which the data supplied from the input end of the node line identified by the line number 3 are produced at the same time from all the lines of the line #0 to line #7.

Thus, not only a switching pattern of data paths with N outputs vs. N inputs (N is a natural number), but also a switching pattern of data paths with M outputs vs. N inputs (N<M) can be implemented. Moreover, because the designated address is generated merely by specifying the line number, and the switch circuit 50 of each node line corresponding to this designated address conducts data transfer autonomously, the cross point control can be greatly simplified, similarly to the case of the first embodiment.

Figure 26:
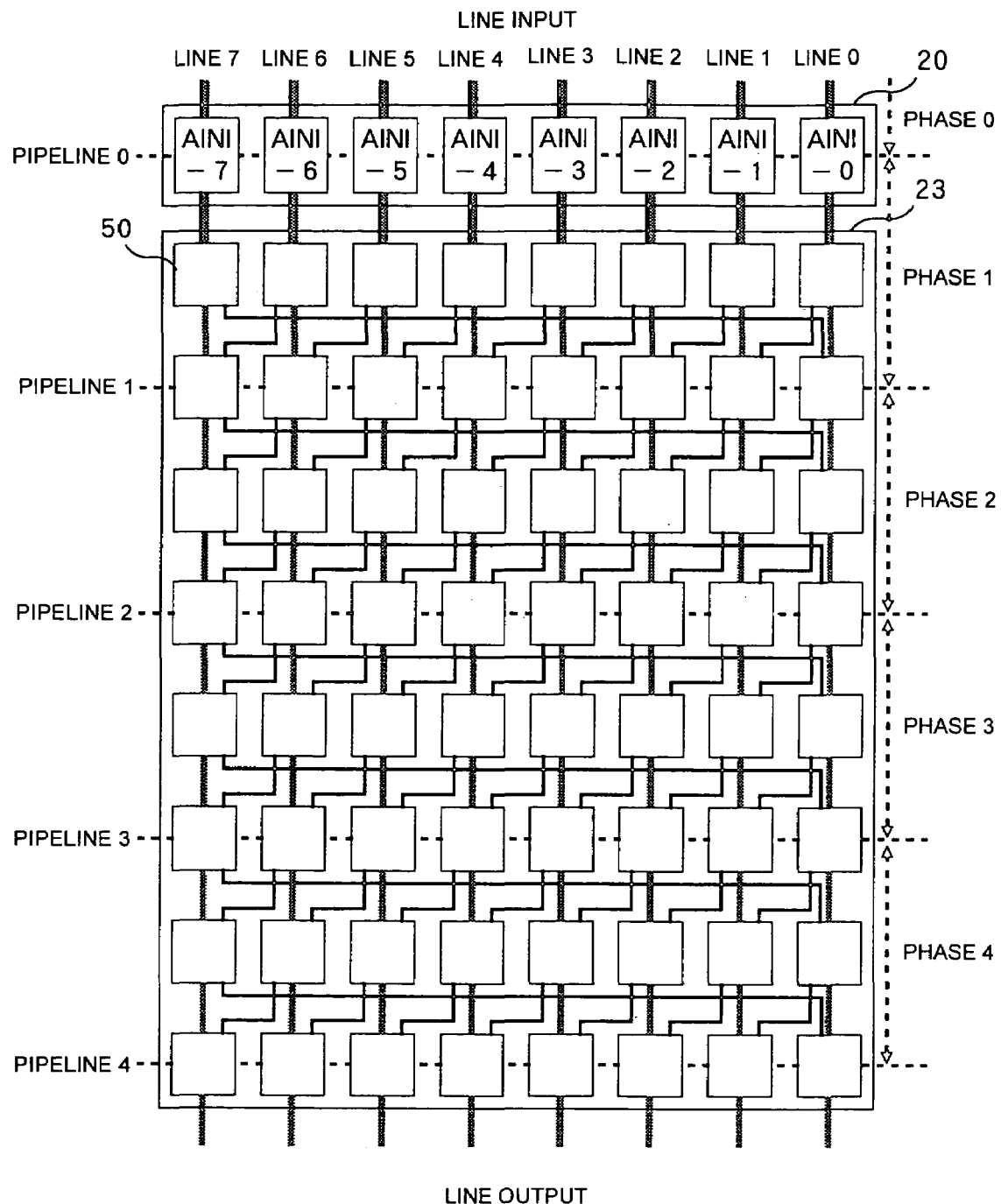
FIG. 26 is a structural view of the inner portion illustrating a modification example of a crossbar switch.

As a modification example, the first path and the second path in the path switching unit 21 can be defined as in the path switching unit 23 shown in FIG. 26.

FIG. 26 shows an example relating to the case in which the first path is defined between the output terminal of the switch circuit 50 of a given stage and the input terminal of another switch circuit 50 in the adjacent column and the next stage with respect to the former switch circuit 50 just mentioned. Furthermore, the above-described crossbar switch of the second embodiment represents an example of pipelining for each one row, but in the crossbar switch shown in FIG. 26, pipelining is made for a plurality of rows. In other words, the operation phase of each node line is switched in several line units, such as phase 0 to phase 4.

Furthermore, in the configuration shown in FIG. 26, when the selected path reaches the leftmost end column, it returns to the input terminal of the switch circuit 50 of the rightmost end column in the next stage, but it may return to the input terminal of the switch circuit 50 which is next to the right in the stage which is directly below.

The present invention has thus been described with reference to two embodiments thereof that, however, place no limitation on the scope of the present invention.

For example, in the first and second embodiments, an example is described in which the address and the designated address are numerical data in descending order, the designated address is decremented each time a node is passed, and data transfer is conducted when the designated address became "0", that is, an example in which a specific value represented by the node address is specified indirectly. However, a configuration can also be employed in which the address and the designated address are numerical data in the ascending order and the value represented by the address increases when a node is passed, and the switch circuit 50 on the node is operated and data transfer is carried out when it is indicated that the value represented by the address reaches an intrinsic value allocated to this node in advance, that is, when the specific value represented by the address of the node is specified directly.

If the address obtained when the specific value is specified indirectly is considered as a relative address, and the address obtained when the specific value is specified directly is considered as an absolute address, then in the above-described example of the crossbar switch, in particular, in the example of the crossbar switch of the second embodiment, in the address(es) following the address initialization unit 20, the value indicating from which line data are taken has to be provided (received) as a relative value with respect to the own address. Therefore, in order to provide for compatibility of operation, it is necessary to convert the relative address to the absolute address in the address initialization unit 20. At this time, from the standpoint of accelerating the processing, it is preferred that an address conversion table be prepared which defines in advance the relation between the relative address and the absolute address during address conversion.

Further, the crossbar switch in accordance with the present invention can be applied not only in the case of selecting a data path introduced between the buffer 1 and the pixel pipeline processor 2, but also for data transfer in parallel computers, ATM (Asynchronous Transfer Mode), Ethernet (trade name), and the like, selection of data path in data communication processing, and other applications.

The description provided hereinabove clearly demonstrates that the present invention can provide a small cost-effective crossbar switch, without increasing the number of lines and without increasing the complexity of switch control during changeover processing of data paths, even when the number of switches is increased. Furthermore, in accordance with the present invention, the present invention can also provide a crossbar switch that can be adapted to multistage pipelines.

What is claimed is:

1. A crossbar switch comprising:
    a node controller provided in each of a plurality of nodes which are cascade connected with each other in a plurality of stages,
    each node controller having:
    an input interface which receives, from a node of a previous-stage, first address information for directly or indirectly specifying a relative position in which a target node controller is present;
    a switch configured to determine whether the received first address information represents a specific value, the switch further configured to output data to a predetermined data output line when it is determined that the specific value is represented, and the switch further configured to generate second address information in which the received first address information is changed according to a predetermined rule; and
    an output interface for supplying the second address information to a node of a subsequent-stage,
    wherein said first address information is configured to designate data that is output from a node of a final stage of a node line to which the first address information is input.

2. The crossbar switch as claimed in claim 1, wherein the first address information and the second address information are circulating numerical data, and
    wherein the output interface is configured to generate the second address information by increasing or decreasing the numerical data by a predetermined value.

3. The crossbar switch as claimed in claim 2, wherein the first address information and the second address information are is serial data comprising a start bit and an end bit.

4. The crossbar switch as claimed in claim 1, wherein the crossbar switch comprises a plurality of node lines each having the nodes of the plurality of stages,
    wherein the node controllers on each node line are operated asynchronously with the node controllers on other node lines.

5. The crossbar switch as claimed in claim 1, wherein the crossbar switch comprises a plurality of node lines each having the nodes of the plurality of stages,
    wherein the node controllers on each node line are operated at the same clock timing with the node controllers on other node lines, at least those that operate in parallel therewith.

6. The crossbar switch as claimed in claim 1, wherein each of the nodes of the plurality of stages is one-to-one associated with output addresses of a predetermined data memory, and
    wherein a switch of each node controller, during operation thereof, is configured to supply data that are received from the data memory to the data output line via the output address associated with the corresponding node.

7. The crossbar switch as claimed in claim 5, wherein a first path and a second path are established, the first path being configured to supply data from a previous-stage node to respective node controllers on each node line and to supply the data to the a subsequent-stage node in a different node line, the second path being configured to supply the first address information from the previous-stage node and to supply the second address information to a subsequent-stage node of the same node line.

8. The crossbar switch as claimed in claim 7, wherein the node controllers are arranged as a row-column matrix on the plurality of node lines such that each column defines a node line and each row defines a stage, wherein the second path is defined in the column direction, and wherein the first path is defined between an output terminal of a node controller in a particular row and the an input terminal of a node controller that is in a row proceeding the particular row and in a different column.

9. The crossbar switch as claimed in claim 8, wherein the first path and the second path in each node controller have the same or approximately the same node length.

10. The crossbar switch as claimed in claim 8, wherein at least all the node controllers arranged in the same row direction are operated according to a clock signal determining the same operation timing.

11. The crossbar switch as claimed in claim 8, wherein the first path is defined between the output terminal of a node controller of the previous stage and the input terminal of a node controller present in the next stage with respect to this node controller and in the adjacent column.

12. The crossbar switch as claimed in claim 8, wherein the entire first path or part thereof is defined between the output terminal of a node controller of the previous stage and the input terminal of a node controller present in the next stage with respect to this node controller and in a position separated by a plurality of columns from this node controller.

13. The crossbar switch as claimed in claim 12, wherein the first path relating to the node controller positioned in the endmost portion in the column direction is defined between the output terminal of the respective node controller and the input terminal of the node controller located in the adjacent position of the next stage.

14. The crossbar switch as claimed in claim 8, wherein address information generation means is provided at each input end of the plurality of node lines, the address information generation means serving to generate the address information according to a first line identification data for use in identifying the node line on which the address information generation means locates, and a second line identification data for use in identifying the node line which is expected to receive the data supplied from a switch in a node in the last stage on the line on which the address information generation means locates.

15. The crossbar switch as claimed in claim 8 accommodated in a package that can be mounted on a computer, wherein interface components are provided at the input ends of the plurality of node lines for use in connecting a first device holding data to be supplied to the input end in question, and different interface components are provided at the output ends of the plurality of node lines for connecting a second device having operation pipelines at one-to-one correspondence with the node lines.

16. The crossbar switch as claimed in claim 8 accommodated in a package that can be mounted on a computer, wherein interface components are provided for connecting, to input ends and/or output ends of said plurality of node lines, a plurality of node lines of a different crossbar switch of the same configuration.

17. A method for operation control of a crossbar switch, the crossbar switch comprising nodes that are cascade connected with each other in a plurality of stages and a plurality of node lines through which received data to be produced flow, each node having a node controller, the method comprising the steps of:

generating an address information from identification information of a node line on which the received data is to be produced, the address information representing a relative position of the node controller which is to be actuated;

supplying the address information to a node of an initial stage of a target node line;

determining, by respective node controllers present in each node of the target node line to which the address information is supplied, whether the received address information represents a specific value, producing the received data present on the target node line when it is determined that the specific value is represented; and generating a new address information by changing the received address information by a predetermined value, and supplying this new address information to nodes of subsequent stages, wherein said received address information is configured to designate data that is output from a node of a final stage of the tar et node line.

18. A program stored on a computer-readable medium for operation control of a crossbar switch, the crossbar switch comprising nodes that are cascade connected with each other in a plurality of stages and a plurality of node lines through which received data to be produced flow, each node having a node controller, the program being carried out by a computer having mounted thereon the crossbar switch to operate each node controller to:

(1) receive address information for directly or indirectly specifying a relative position in which a target node controller is located, wherein said address information is configured to designate data that is output from a node of a final stage of the node line on which the address information is input;

(2) determine whether the received address information represents a specific value, and produce data present on a respective node line when it is determined that the specific value is represented; and (3) generate new address information by changing the received address information by a predetermined value and supply the new address information to nodes of subsequent stages.

* * * * *